(12) United States Patent
Imamura et al.

(10) Patent No.: US 11,366,311 B2
(45) Date of Patent: Jun. 21, 2022

(54) DISPLAY DEVICE

(71) Applicant: Panasonic Intellectual Property Management Co., Ltd., Osaka (JP)

(72) Inventors: Norihiro Imamura, Osaka (JP); Keiichi Matsuzaki, Kyoto (JP); Kenji Nagatomi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/211,065

(22) Filed: Mar. 24, 2021

(65) Prior Publication Data

US 2021/0311301 A1 Oct. 7, 2021

(30) Foreign Application Priority Data

Apr. 1, 2020 (JP) .............................. JP2020-065535
Nov. 17, 2020 (JP) .............................. JP2020-191073

(51) Int. Cl.
*G02B 27/00* (2006.01)
*G02B 5/09* (2006.01)
*G02B 5/30* (2006.01)

(52) U.S. Cl.
CPC ........... *G02B 27/0018* (2013.01); *G02B 5/09* (2013.01); *G02B 5/3025* (2013.01); *G02B 5/3083* (2013.01)

(58) Field of Classification Search
CPC .. G02B 27/0018; G02B 27/28; G02B 27/283; G02B 27/286; G02B 5/09; G02B 5/3025; G02B 5/3083; G02B 5/08; G02B 5/10; G02B 5/30; G02B 27/01; G02B 27/0101; G02B 27/00; G02B 27/0103;
(Continued)

(56) References Cited

U.S. PATENT DOCUMENTS 6,341,038 B1 1/2002 Budd et al.
10,120,188 B2 11/2018 Matsuzaki et al.
(Continued)

FOREIGN PATENT DOCUMENTS

JP 2006-091333 A 4/2006
JP 2007-033669 A 2/2007
(Continued)

OTHER PUBLICATIONS

U.S. Appl. No. 17/125,578 to Norihiro Imamura et al., filed Dec. 17, 2020.
(Continued)

*Primary Examiner* — Derek S. Chapel
*Assistant Examiner* — Adam W Booher
(74) *Attorney, Agent, or Firm* — Greenblum & Bernstein, P.L.C.

(57) ABSTRACT

A display device includes: a display element including a display surface on which image is displayed; a first mirror and a second mirror that reflects emission light emitted from the display surface of the display element; and a polarization element. The polarization element is configured to reflect and transmit the emission light from display surface. The emission light from display surface is reflected off polarization element twice and transmitted through polarization element once by a time the emission light is reflected off first mirror and second mirror and exits from display device.

20 Claims, 21 Drawing Sheets

(58) Field of Classification Search
CPC .......... G02B 27/0093; G02B 3/00; G02B 2027/014; G02B 2003/0093; B60R 1/08; B60R 1/02; B60R 1/04; B60R 1/00; B60R 1/20–31; B60R 2001/1215; B60R 2001/1253; B60R 2300/8046; B60K 35/00; B60K 2370/785; B60K 2370/1529; B60K 2370/21; B60K 2370/347; B60K 2370/29; B60K 2370/31; B60K 2370/332; B60K 2370/333; B60K 2370/152; B60K 2370/1537

See application file for complete search history.

(56) References Cited

U.S. PATENT DOCUMENTS

| | | |
|---|---|---|
| 10,427,598 B2 | 10/2019 | Yamagata et al. |
| 10,525,886 B2 | 1/2020 | Imamura et al. |
| 10,613,325 B2 | 4/2020 | Matsuzaki et al. |
| 10,730,440 B2 | 8/2020 | Imamura et al. |
| 10,809,526 B2 | 10/2020 | Matsuzaki et al. |
| 10,836,314 B2 | 11/2020 | Imamura et al. |
| 10,882,454 B2 | 1/2021 | Imamura et al. |
| 10,940,800 B2 | 3/2021 | Imamura et al. |
| 10,953,799 B2 | 3/2021 | Imamura et al. |
| 11,042,040 B2 | 6/2021 | Xiao et al. |
| 2018/0039052 A1 | 2/2018 | Khan et al. |
| 2018/0101020 A1 | 4/2018 | Collier et al. |
| 2020/0314297 A1 | 10/2020 | Matsuzaki et al. |
| 2020/0314303 A1 | 10/2020 | Yamagata et al. |
| 2020/0377021 A1 | 12/2020 | So et al. |
| 2021/0001778 A1 | 1/2021 | Oishi |
| 2021/0101531 A1 | 4/2021 | Imamura et al. |
| 2021/0129755 A1 | 5/2021 | Imamura et al. |
| 2021/0191116 A1* | 6/2021 | Shi .......... G02B 5/3083 |
| 2021/0382304 A1* | 12/2021 | You .......... G02B 3/00 |

FOREIGN PATENT DOCUMENTS

| | | |
|---|---|---|
| JP | 2011-524019 A | 8/2011 |
| JP | 2012-509507 A | 4/2012 |
| JP | 2013-210588 A | 10/2013 |
| JP | 2017-210229 A | 11/2017 |
| WO | 2009/139798 A1 | 11/2009 |
| WO | 2010/059453 A2 | 5/2010 |
| WO | 2014/045555 A1 | 3/2014 |
| WO | 2019/154428 A1 | 8/2019 |
| WO | 2009/139798 A1 | 11/2019 |

OTHER PUBLICATIONS

U.S. Appl. No. 17/174,815 to Kenji Nagatomi et al., filed Feb. 12, 2021.

U.S. Appl. No. 17/230,618 to Norihiro Imamura et al., filed Apr. 14, 2021.

Office Action issued in Japanese Counterpart Patent Appl. No. 2020-191073, dated Feb. 11, 2021along with an English translation thereof.

Office Action issued in German Counterpart Patent Appl. No. 102021107828, dated Mar. 17, 2022, along with an English translation thereof.

* cited by examiner

DISPLAY DEVICE

CROSS REFERENCE TO RELATED APPLICATION

The present application is based on and claims priority of Japanese Patent Applications Nos. 2020-065535 filed on Apr. 1, 2020 and 2020-191073 filed on Nov. 17, 2020.

FIELD

The present disclosure relates to a display device for displaying images.

BACKGROUND

A camera mounted on a vehicle may take a rear image showing an area behind the vehicle, and the rear image taken by the camera may be displayed on a rearview-mirror-type display device in the vehicle. Such display devices are known as electronic mirrors. (For example, see Patent Literature 1 (PTL 1))

A display device in PTL 1 includes a case, a display, a half mirror, and a concave mirror. The display, the half mirror, and the concave mirror are disposed in the case. The display shows a rear image taken by a camera.

Emission light emitted from the display is reflected off the half mirror and reaches the concave mirror. The emission light is then reflected off the concave mirror and transmitted through the half mirror to enter the driver's eyes. The driver sees the rear image reflected off the concave mirror. To the driver's eyes, a virtual image of the rear image appears to be displayed at a display position ahead of the concave mirror toward the front of the vehicle.

CITATION LIST

Patent Literature

PTL 1: Japanese Unexamined Patent Application Publication No. 2017-210229

SUMMARY

However, the conventional display device described above admits of improvement.

To address this, the present disclosure provides a display device that can attain further improvement.

A display device according to an aspect of the present disclosure includes: a display element including a display surface on which image is displayed; at least two mirrors that reflects emission light emitted from the display surface of the display element; and a polarization element, wherein the polarization element is configured to reflect and transmit the emission light, and the emission light is reflected off the polarization element twice and transmitted through the polarization element once by a time the emission light is reflected off the at least two mirrors and exits from the display device.

A display device according to an aspect of the present disclosure can attain further improvement.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
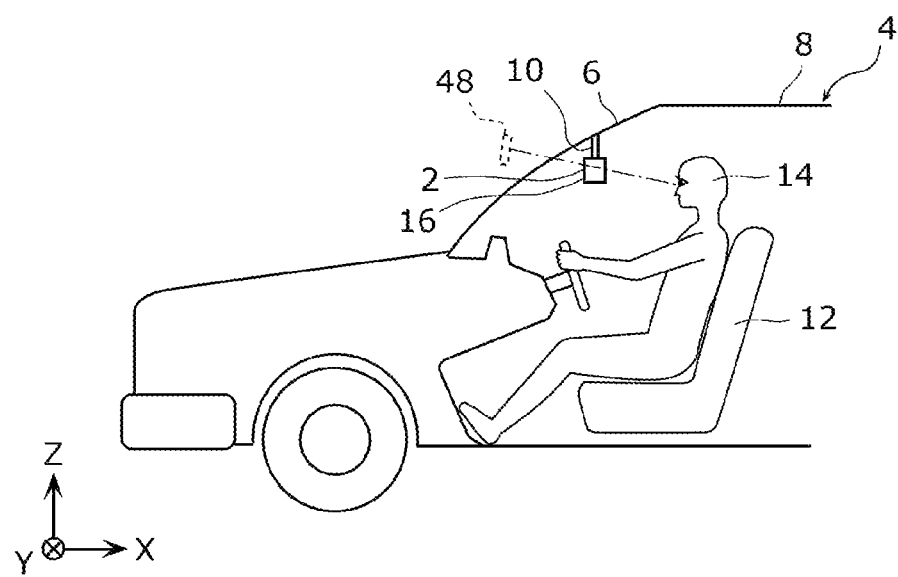
FIG. 1 is a diagram showing an example of a vehicle equipped with a display device according to Embodiment 1.

DESCRIPTION OF EMBODIMENTS (Knowledge Based on which the Present Disclosure was Made)

The inventors have found the following problem related to the display device described in the above [Background Art].

In the display device of PTL 1, a distance from eyes of a driver to a display position of a virtual image (hereinafter, referred to as a "visual distance") is determined based on an optical path length along which emission light travels from a display to a concave mirror via a half mirror. Therefore, in order to ensure a sufficient visual distance, it is necessary to set the optical path length to a predetermined length. However, this correspondingly increases distances between the components (the display, the half mirror, and the concave mirror), thereby increasing a size of the case.

In order to solve such a problem, a display device according to an aspect of the present disclosure includes: a display element including a display surface on which image is displayed; at least two mirrors that reflects emission light emitted from the display surface of the display element; and a polarization element, wherein the polarization element is configured to reflect and transmit the emission light, and the emission light is reflected off the polarization element twice and transmitted through the polarization element once by a time the emission light is reflected off the at least two mirrors and exits from the display device.

According to this aspect, because the emission light from the display surface is reflected off the polarization element twice and transmitted through the polarization element once, the number of optical paths leading to the polarization element can be increased to three in total. This can increase the optical path length, thereby reducing the entire device size while ensuring a sufficient visual distance.

For example, it is possible that the emission light is reflected off the polarization element, then reflected off one of the at least two mirrors, then transmitted though the polarization element, then reflected off an other of the at least two mirrors, and then reflected again on the polarization element.

According to this aspect, reflection light paths can be provided on both sides of the polarization element. The emission light can be transmitted through the polarization element to transfer from one reflection light path to the other reflection light path. Because the emission light follows one reflection light path and then transfers to and follows the other reflection light path, the optical path length can be correspondingly increased. This can reduce the entire device size while ensuring a sufficient visual distance.

For example, it is also possible that the at least two mirrors include a first mirror and a second mirror, the first mirror is closer to one of an upper end and a lower end of the display surface, the second mirror is closer to an other of the upper end and the lower end of the display surface, the polarization element is located between the first mirror and the second mirror and opposes the display surface, the display device further comprises a first λ/4 plate located between the polarization element and the first mirror, the polarization element includes: a reflective polarization plate opposing the display surface and the first mirror; and a second λ/4 plate opposing the second mirror, and the emission light is: (a) reflected off the reflective polarization plate; (b) transmitted through the first λ/4 plate; (c) reflected off the first mirror to be transmitted again through the first λ/4 plate; (d) transmitted through each of the reflective polarization plate and the second λ/4 plate; (e) reflected off the second mirror; (f) transmitted through the second λ/4 plate; and (g) reflected off the reflective polarization plate to be transmitted again through the second λ/4 plate.

According to this aspect, the emission light from display surface is (i) reflected off the reflective polarization plate, (ii) reflected off the first mirror, (iii) reflected off the second mirror, and (iv) reflected off the reflective polarization plate. That is, the emission light from the display surface is reflected at least four times in total. Short distances can therefore be achieved between the components (the display element, the polarization element, the first mirror, and the second mirror) for setting a predetermined optical path length along which the emission light from the display surface travels to the second mirror via the polarization element, the first mirror, and again the polarization element. This can reduce the entire device size while ensuring a sufficient visual distance.

For example, it is further possible that at least one of the first mirror and the second mirror is a concave mirror.

According to this aspect, if the display device is used as, for example, an electronic mirror for a vehicle, the driver sees the emission light from the display surface (light that forms a rear image) reflected off the concave mirror. To the driver, then, a virtual image of the rear image appears to be displayed at a display position ahead of the concave mirror toward the front of the vehicle. This provides an advantageous effect of a relatively low degree of eye focus adjustment required for the driver to move the line of sight to the virtual image of the rear image when the driver sees the front of the vehicle through the windshield.

For example, it is further possible that the second mirror is a concave mirror, and at least one of an upper end part and a lower end part of the second mirror is curved to have a convex shape in a front view of the second mirror.

According to this aspect, the second mirror can be disposed in close proximity to the polarization element to more effectively reduce the entire device size.

For example, it is further possible that the second mirror is a concave mirror, and the polarization element has an end part opposing the second mirror, the end part being curved to have a convex shape corresponding to a concave shape of the second mirror.

According to this aspect, the end part of the polarization element opposing the second mirror can be disposed in close proximity to the concave surface of the second mirror to more effectively reduce the entire device size.

For example, it is further possible that The display device according to any one of claims 3 to 6, further comprising: a transmissive polarization plate opposing the second λ/4 plate of the polarization element; and a third λ/4 plate located between the transmissive polarization plate and the second λ/4 plate, wherein the emission light which is reflected off the reflective polarization plate and then transmitted again through the second λ/4 plate is transmitted through each of the third λ/4 plate and the transmissive polarization plate.

According to this aspect, stray light generated in the display device can be attenuated when the stray light is transmitted through the transmissive polarization plate. This can prevent reflections in the image displayed on the display surface of the display element.

For example, it is further possible that the polarization element has a wedge-shaped cross section, and the polarization element includes a first end part closer to the second mirror and a second end part closer to the first mirror, the first end part having a thickness different from a thickness of the second end part.

According to this aspect, a double image can be prevented.

For example, it is further possible that the first mirror is a Fresnel mirror.

According to this aspect, because the first mirror is a Fresnel mirror, the first mirror can be disposed, for example, parallel to the horizontal direction to correspondingly reduce the entire device size more effectively.

For example, it is further possible that the first λ/4 plate is inclined with respect to the first mirror.

According to this aspect, a double image can be prevented.

For example, it is further possible that a perpendicular line perpendicular to the display surface is not parallel with an optical path of the emission light that is transmitted again through the second λ/4 plate after being reflected off the reflective polarization plate.

According to this aspect, reflections in the image displayed on the display surface of the display element can be prevented.

For example, it is further possible that the emission light emitted from the display surface is a linear polarized light having a polarization direction perpendicular to a transmission axis of the reflective polarization plate, and the polarization element is inclined with respect to the display surface, about an axis line parallel to the polarization direction of the linear polarized light.

According to this aspect, for the display device viewed from a direction angled with respect to the perpendicular line to the display surface, it is possible to prevent part of the emission light from the display surface from being transmitted through the reflective polarization plate and leaking out without being reflected off the reflective polarization plate.

For example, it is further possible that the display device further includes: a case housing the display element, the at least two mirrors, and the polarization element, the case having an opening from which the emission light exits, wherein the at least two mirrors include a first mirror and a second mirror, and in a view from the opening, the display element is disposed in an upper part of the case, the first mirror is disposed in an innermost part of the case, and the second mirror is disposed in a lower part of the case, the polarization element is located between the display element and the second mirror and is inclined to cause an upper end part of the polarization element to be closer to the opening than a lower end part of the polarization element is.

According to this aspect, because the display element is disposed in the upper part of the case, the heat of air heated by the display element is released from the top of the case. This can prevent thermal influence on other components.

Hereinafter, certain exemplary embodiments will be described in detail with reference to the accompanying Drawings.

The following embodiments are general or specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Embodiment 1

1-1. Overview of Display Device

First, an overview of display device 2 according to Embodiment 1 will be described with reference to FIG. 1. FIG. 1 is a diagram showing an example of vehicle 4 equipped with display device 2 according to Embodiment 1.

As shown in FIG. 1, for example, display device 2 is attached to windshield 6 of vehicle 4 at a position close to ceiling 8 via bracket 10. Display device 2 is thus disposed to be in the sight of driver 14 sitting in driver's seat 12 and facing forward. Although this embodiment describes display device 2 as being attached to windshield 6, this is not limiting. Rather, display device 2 may be attached to an overhead console, for example.

In the following description, the direction in which vehicle 4 is driven forward will be referred to as "front," and the direction in which vehicle 4 is driven backward will be referred to as "rear". In FIG. 1, the X-axis direction denotes the front-rear direction (the horizontal direction) of vehicle 4, the Y-axis direction denotes the right-left direction of vehicle 4, and the Z-axis direction denotes the top-bottom direction (the vertical direction) of vehicle 4. In FIG. 1, "front" corresponds to the negative side on the X axis, "rear" corresponds to the positive side on the X axis, "upper" corresponds to the positive side on the Z axis, and "lower" corresponds to the negative side on the Z axis.

Vehicle 4 is an automobile, for example a regular passenger car, a bus, or a truck. A camera (not shown) for capturing an area behind vehicle 4 is mounted on vehicle 4, e.g., on the rear bumper or the trunk hood. Although this embodiment describes display device 2 as being provided in vehicle 4 illustrating a mobile body, this is not limiting. Rather, display device 2 may be provided in various mobile bodies, for example construction machinery, agricultural machinery, watercraft, or aircraft.

Display device 2 is what is called an electronic mirror for displaying a rear image taken by the camera. Driver 14 can look at the rear image displayed on display device 2 to check the area behind vehicle 4 shown in the rear image. That is, display device 2 is used in place of a conventional physical rearview mirror that shows the area behind vehicle 4 based on the reflection of light.

1-2. Configuration of Display Device

Figure 2:
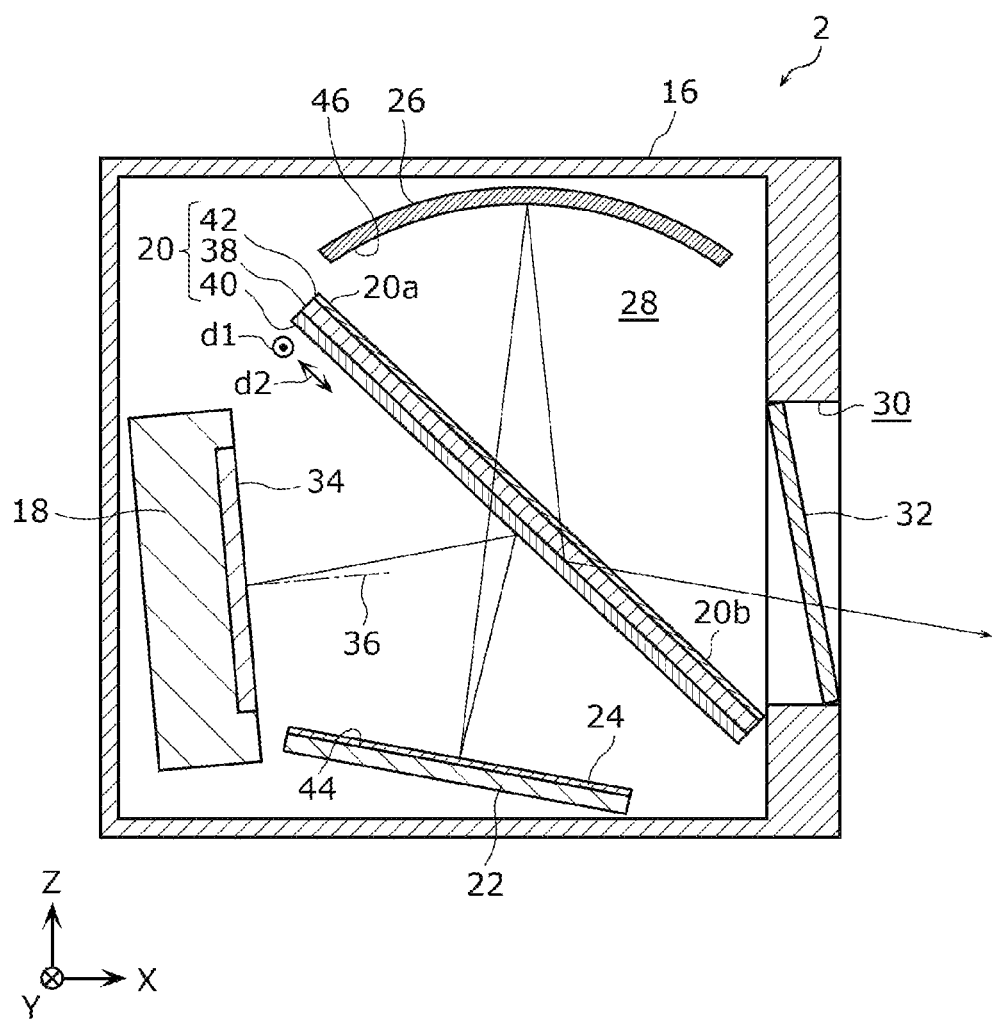
FIG. 2 is a sectional view of the display device according to Embodiment 1.
Figure 3A:
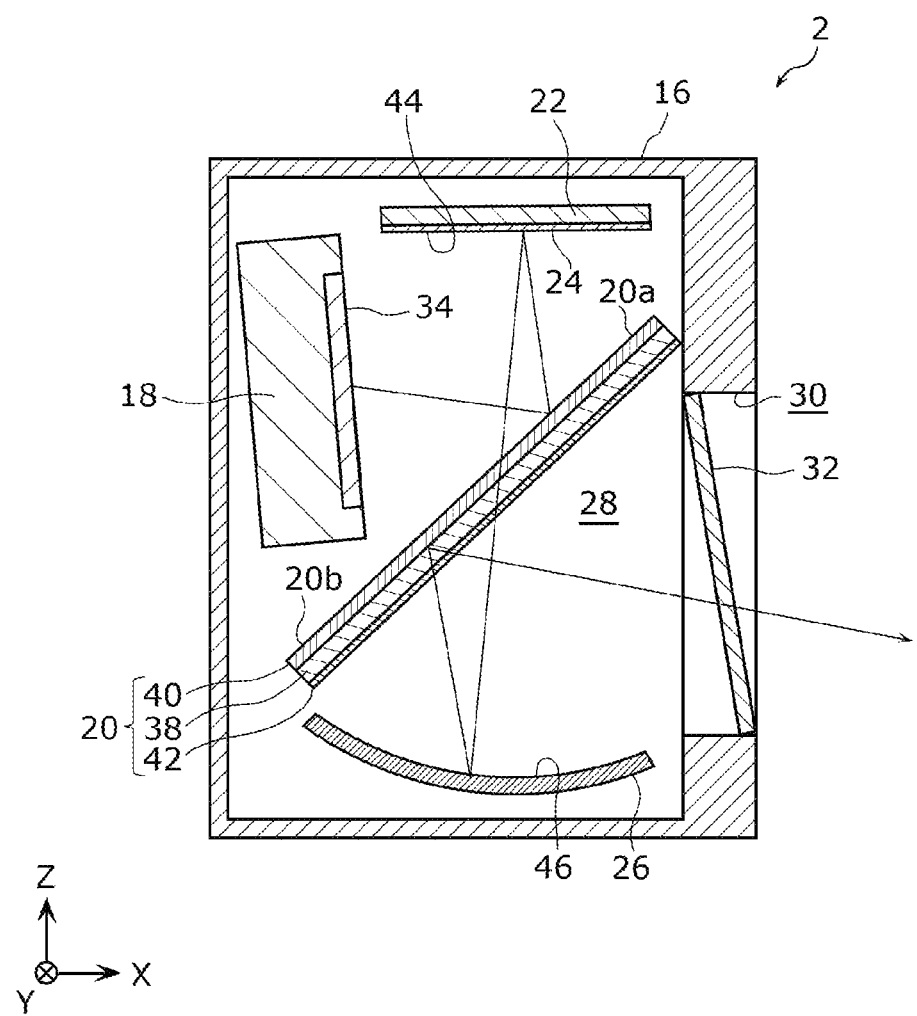
FIG. 3A is a sectional view of another form of the display device according to Embodiment 1.
Figure 3B:
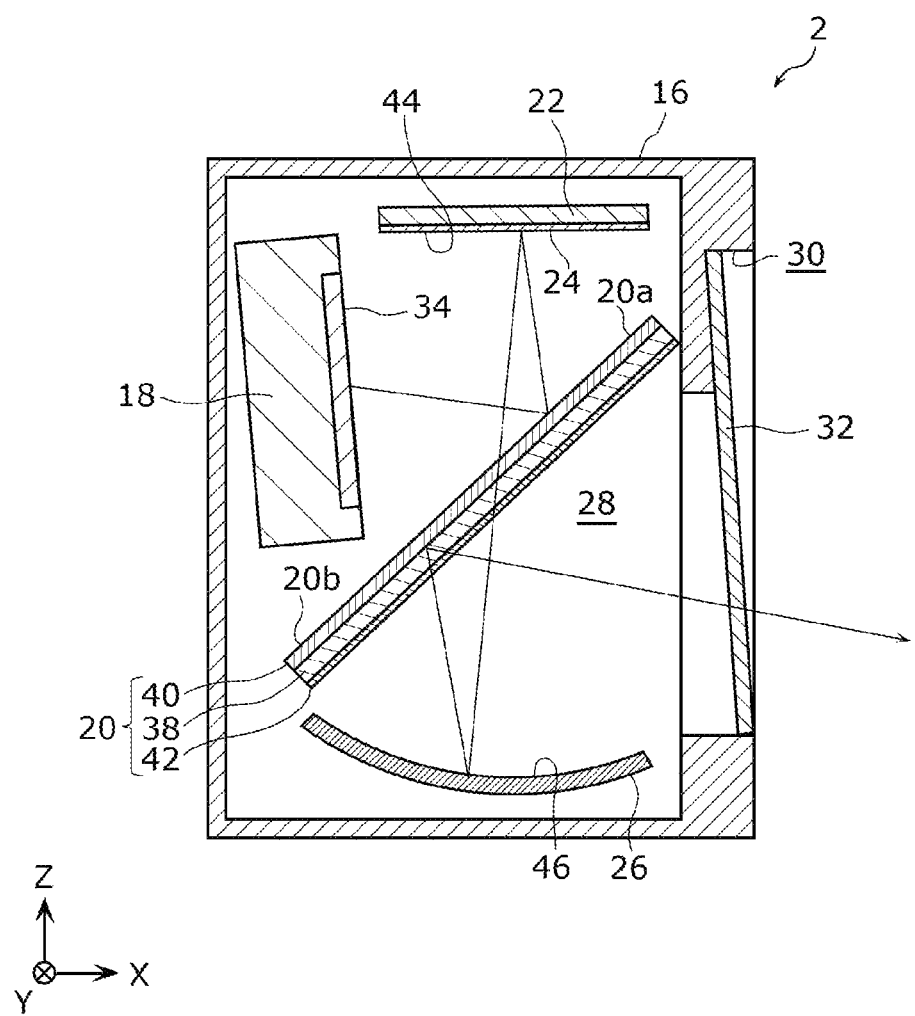
FIG. 3B is a sectional view of still another form of the display device according to Embodiment 1.

Now, the configuration of display device 2 according to Embodiment 1 will be described with reference to FIGS. 1 to 3B. FIG. 2 is a sectional view of display device 2 according to Embodiment 1. FIG. 3A is a sectional view of another form of display device 2 according to Embodiment 1. FIG. 3B is a sectional view of still another form of display device 2 according to Embodiment 1.

As shown in FIG. 2, display device 2 includes case 16, display element 18, polarization element 20, first mirror 22, first λ/4 plate 24, and second mirror 26. In this specification, "plate" is a concept that includes plates as well as members called films, seats, etc.

Case 16 is made of, for example, a synthetic resin and has storage space 28 inside. Storage space 28 of case 16 stores display element 18, polarization element 20, first mirror 22, first λ/4 plate 24, and second mirror 26. As shown in FIG. 1, case 16 is suspended from windshield 6 of vehicle 4 via bracket 10.

Opening 30 communicating with storage space 28 is provided on a side of case 16 (the side opposing driver 14). Opening 30 has a horizontal rectangular shape. That is, opening 30 is longer in the right-left direction (the Y-axis direction) than in the top-bottom direction (the Z-axis direction). Opening 30 is configured such that the part above opening 30 (the part on the positive side on the Z-axis) is greater in length in the Z-axis direction (height) than the part below opening 30. This can prevent unwanted reflections. Opening 30 in case 16 is blocked with plate-shaped dust cover 32 made of, for example, a transparent resin or glass. This can prevent foreign bodies such as outside dust from entering storage space 28 of case 16 through opening 30. Dust cover 32 is inclined with respect to the vertical direction such that the surface opposing driver 14 faces diagonally upward. This can prevent outside light from reflecting on dust cover 32.

Display element 18 is a liquid crystal display (LCD), for example. Display element 18 includes display surface 34 for displaying a rear image taken by the camera on vehicle 4. Display surface 34 is inclined with respect to the vertical direction, for example to face diagonally upward. Display surface 34 has a horizontal rectangular shape and is disposed to oppose opening 30 in case 16. That is, display surface 34 is longer in the right-left direction than in the top-bottom direction. Display surface 34 emits light for forming the rear image (hereafter referred to as "emission light"). The emission light from display surface 34 is linearly polarized light having a polarization direction in first direction d1 (the Y-axis direction perpendicular to the sheet surface of FIG. 2). The direction of the emission light from display surface 34 is inclined upward with respect to perpendicular line 36 to display surface 34. In this specification, "perpendicular" means exactly perpendicular as well as substantially perpendicular, for example with some degrees of deviation.

Polarization element 20 is disposed to oppose display surface 34 of display element 18. Polarization element 20 includes glass board 38, reflective polarization plate 40, and second λ/4 plate 42. Polarization element 20 has a generally planar shape and is inclined with respect to display surface 34 about an axis line parallel to the polarization direction of the emission light from display surface 34 of display element 18 (about the Y axis). In this specification, "parallel" means exactly parallel as well as substantially parallel, for example with some degrees of deviation. Here, upper end part 20a (the end part on the positive side on the Z-axis) of polarization element 20 is disposed closer to display surface 34 of display element 18, whereas lower end part 20b (the end part on the negative side on the Z-axis) of polarization element 20 is disposed farther from display surface 34 of display element 18. Polarization element 20 is formed by stacking reflective polarization plate 40, glass board 38, and second λ/4 plate 42 in this order from the side closer to display surface 34 of display element 18. Alternatively, polarization element 20 may be formed by, for example, stacking glass board 38, reflective polarization plate 40, and second λ/4 plate 42 in this order from the side closer to display surface 34 of display element 18.

Glass board 38 is a board for supporting reflective polarization plate 40 and second λ/4 plate 42 and is made of, for example, transparent glass. Reflective polarization plate 40 is on a first surface of glass board 38 (the surface opposing display surface 34 of display element 18 and opposing first mirror 22). Second λ/4 plate 42 is on a second surface of glass board 38 opposite to the first surface (the surface opposing second mirror 26).

Of the light reaching reflective polarization plate 40, reflective polarization plate 40 reflects linearly polarized light components in first direction d1 and transmits linearly polarized light components in second direction d2 (the direction in the XZ-plane along the sheet surface of FIG. 2) orthogonal to first direction d1. That is, the reflection axis and the transmission axis of reflective polarization plate 40 are in first direction d1 and second direction d2, respectively, which are orthogonal to each other. In this specification, "orthogonal" means exactly orthogonal as well as substantially orthogonal, for example with some degrees of deviation.

Second λ/4 plate 42 is a phase difference plate for converting the light reaching second λ/4 plate 42 from linearly polarized light into circularly polarized light (or from circularly polarized light into linearly polarized light). Second λ/4 plate 42 has a function of creating a phase difference of one fourth of wavelength λ, (i.e., a phase difference of 90°) between linearly polarized light components orthogonal to each other in the light reaching second λ/4 plate 42.

First mirror 22 and second mirror 26 are disposed closer to the lower end and the upper end in the top-bottom direction, respectively, of display surface 34 of display element 18. That is, polarization element 20 is disposed between first mirror 22 and second mirror 26.

Display device 2 shown in FIG. 2 may have a configuration in which the arrangement of the components in case 16, except case 16 and dust cover 32, is reversed in the top-bottom direction (the Z-axis direction). FIG. 3A shows this configuration. In this configuration, first mirror 22 and second mirror 26 are disposed closer to the upper end and the lower end in the top-bottom direction, respectively, of display surface 34 of display element 18. Thus, first mirror 22 is disposed closer to one of the upper end and the lower end of display surface 34, whereas second mirror 26 is disposed closer to the other one of the upper end and the lower end of display surface 34.

It is to be noted that, in the embodiments and variations to be described below, the arrangement of the components in case 16 (16D) may be reversed in the top-bottom direction as described above.

In FIG. 3A, display element 18 and polarization element 20 are disposed to overlap when viewed in the Z-axis direction. Configuring in this manner can reduce the depth (the length in the X-axis direction) of case 16. It is to be noted that, in the embodiments and variations to be described below, display element 18 and polarization element 20 may be disposed to overlap when viewed in the Z-axis direction, as described above.

As described with reference to FIG. 2, in FIG. 3A, again, the part above opening 30 (the part on the positive side on the Z axis) is greater in length in the Z-axis direction (height) than the part below opening 30. Because the part above opening 30 is wider, a supporting member for dust cover 32 may be disposed above opening 30 as shown in FIG. 3B to enhance the appearance. Configuring in this manner can still prevent unwanted reflections. In this configuration, because of the supporting member disposed, the upper end of polarization element 20 is correspondingly shortened. The configuration in FIG. 3B may also be applied to other configuration diagrams.

First mirror 22 is a plane mirror and has planar reflection surface 44. For example, first mirror 22 is formed by evaporating a reflective metal film such as an aluminum film onto a surface of a glass base. First mirror 22 is disposed below polarization element 20 such that reflection surface 44 opposes reflective polarization plate 40 of polarization element 20. First mirror 22 is inclined with respect to the horizontal direction such that reflection surface 44 faces toward opening 30 in case 16.

First λ/4 plate 24 is a phase difference plate for converting the light reaching first λ/4 plate 24 from linearly polarized light into circularly polarized light (or from circularly polarized light into linearly polarized light). First λ/4 plate 24 has a function of creating a phase difference of one fourth of wavelength λ, (i.e., a phase difference of 90°) between linearly polarized light components orthogonal to each other in the light reaching first λ/4 plate 24. First λ/4 plate 24 is disposed to cover reflection surface 44 of first mirror 22. That is, first λ/4 plate 24 is disposed between polarization element 20 and first mirror 22. The slow axes of first λ/4 plate 24 and second λ/4 plate 42 are parallel or perpendicular to each other and can be appropriately selected according to lagging phase distribution characteristics at the transmission wavelength.

Second mirror 26 is a concave mirror and has free-form reflection surface 46. For example, second mirror 26 is formed by evaporating a reflective metal film such as an aluminum film onto a surface of a resin-molded member. Second mirror 26 is disposed above polarization element 20 such that reflection surface 46 opposes second λ/4 plate 42 of polarization element 20.

1-3. Operations of Display Device

Figure 4:
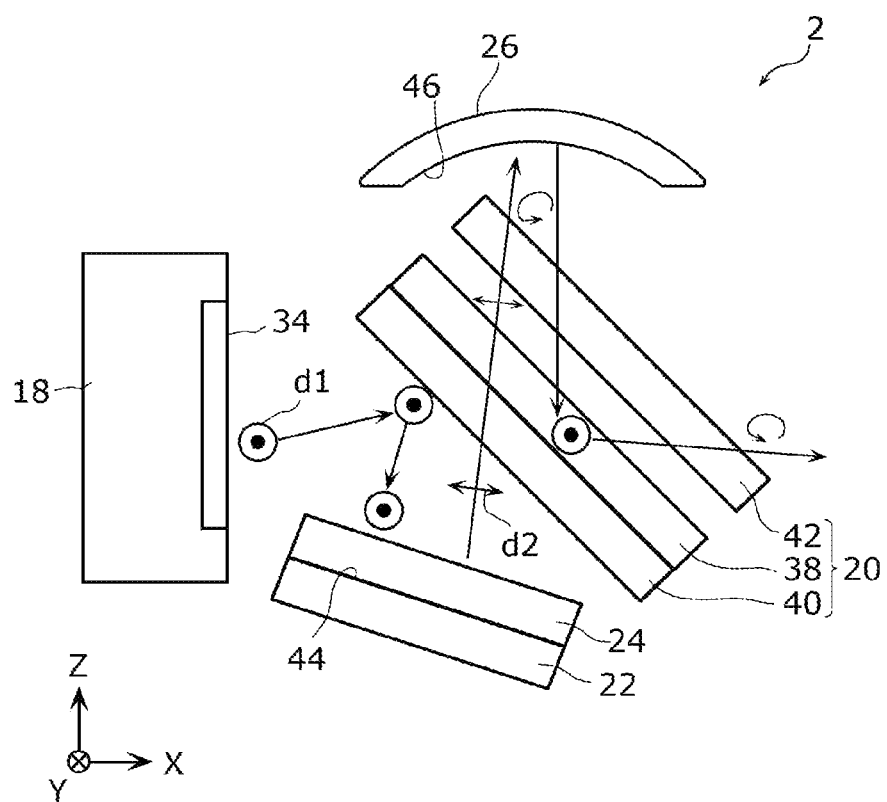
FIG. 4 is a schematic diagram for describing operations of the display device according to Embodiment 1.
Figure 5:
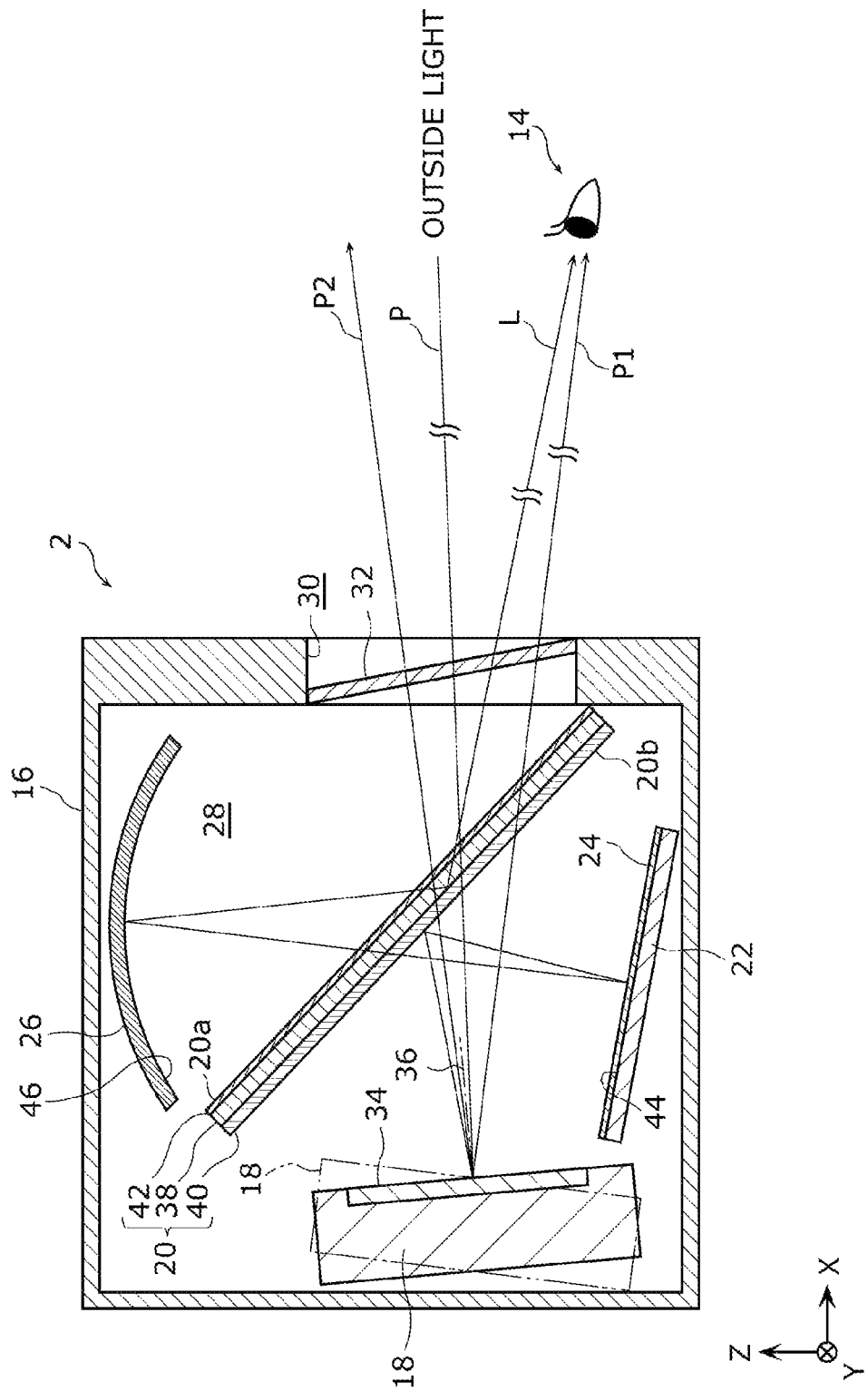
FIG. 5 is a diagram for describing a state of the display device according to Embodiment 1 in which a display surface of a display element faces a driver's eyes.

Now, operations of display device 2 according to Embodiment 1 will be described with reference to FIGS. 1, 4, and 5. FIG. 4 is a schematic diagram for describing the operations of display device 2 according to Embodiment 1. FIG. 5 is a diagram for describing a state of display device 2 according to Embodiment 1 in which display surface 34 of display element 18 faces the eyes of driver 14. It is to be noted that the arrangement and shapes of the components of display device 2 shown in FIG. 4 is schematic and may be different from the actual arrangement and shapes. This also applies to schematic diagrams for the embodiments to be described below.

As shown in FIG. 4, the emission light from display surface 34 of display element 18 reaches reflective polarization plate 40 of polarization element 20. At this point, the polarization direction of the emission light reaching reflective polarization plate 40 is first direction d1, which is also the direction of the reflection axis of reflective polarization plate 40. Therefore, the emission light reaching reflective polarization plate 40 is reflected off reflective polarization plate 40.

The emission light reflected off reflective polarization plate 40 is transmitted through first λ/4 plate 24 to reach reflection surface 44 of first mirror 22, and reflected off reflection surface 44 of first mirror 22. At this point, the emission light transmitted through first λ/4 plate 24 is converted from the linearly polarized light in first direction d1 into circularly polarized light.

The emission light reflected off reflection surface 44 of first mirror 22 is transmitted again through first λ/4 plate 24 and reaches reflective polarization plate 40. At this point, the emission light transmitted again through first λ/4 plate 24 is converted from the circularly polarized light into linearly polarized light in second direction d2.

The polarization direction of the emission light reaching reflective polarization plate 40 is second direction d2, which is also the direction of the transmission axis of reflective polarization plate 40. Therefore, the emission light reaching reflective polarization plate 40 is transmitted through reflective polarization plate 40.

The emission light transmitted through reflective polarization plate 40 is transmitted through glass board 38 and second λ/4 plate 42 to reach reflection surface 46 of second mirror 26, and reflected off reflection surface 46 of second mirror 26. At this point, the emission light transmitted through second λ/4 plate 42 is converted from the linearly polarized light in second direction d2 into circularly polarized light.

In this embodiment, as an example, the reflection angle of the emission light on reflection surface 46 of second mirror 26 is within a range of 8° to 15°. However, the reflection angle of the emission light on reflection surface 46 of second mirror 26 is not limited to this range but may be below or above this range.

The emission light reflected off reflection surface 46 of second mirror 26 is transmitted through second λ/4 plate 42 and glass board 38 to reach reflective polarization plate 40. At this point, the emission light transmitted through second λ/4 plate 42 is converted from the circularly polarized light into linearly polarized light in first direction d1. The polarization direction of the emission light reaching reflective polarization plate 40 is first direction d1, which is also the direction of the reflection axis of reflective polarization plate 40. Therefore, the emission light reaching reflective polarization plate 40 is reflected off reflective polarization plate 40.

The emission light reflected off reflective polarization plate 40 is transmitted through glass board 38 and transmitted again through second λ/4 plate 42 to reach dust cover 32 (see FIG. 2). At this point, the emission light transmitted again through second λ/4 plate 42 is converted from the linearly polarized light in first direction d1 into circularly polarized light. The emission light reaching dust cover 32 is transmitted through dust cover 32 and enters the eyes of driver 14 (see FIG. 1).

In the above manner, the emission light from display surface 34 of display element 18 is (i) reflected off reflective polarization plate 40, (ii) reflected off reflection surface 44 of first mirror 22, (iii) reflected off reflection surface 46 of second mirror 26, and (iv) reflected off reflective polarization plate 40 to enter the eyes of driver 14. That is, the emission light from display surface 34 of display element 18 is reflected in case 16 four times in total before entering the eyes of driver 14.

Thus, while being reflected off first mirror 22 and second mirror 26 (hereafter collectively referred to simply as "mirrors") before exiting from case 16 through dust cover 32, the emission light from display surface 34 of display element 18 is reflected off polarization element 20 twice and transmitted through polarization element 20 once. Specifically, the emission light is reflected off polarization element 20, then reflected off first mirror 22, then transmitted through polarization element 20, then reflected off second mirror 26, and again reflected off polarization element 20.

Driver 14 sees a rear image reflected off reflection surface 46 of second mirror 26. As shown in FIG. 1, to driver 14, virtual image 48 of the rear image appears to be displayed at a display position ahead of display device 2 toward the front of vehicle 4. Therefore, driver 14 seeing the front of vehicle 4 through windshield 6 needs a relatively low degree of eye focus adjustment to move the line of sight to virtual image 48 of the rear image.

Here, the polarization direction of the emission light from display surface 34 of display element 18 is preferably first direction d1. Suppose that the polarization direction of the emission light from display surface 34 of display element 18 is second direction d2, and that the transmission axis and the reflection axis of reflective polarization plate 40 is first direction d1 and second direction d2, respectively. Then, when driver 14 sees display device 2 from diagonally below, part of the emission light from display surface 34 of display element 18 is transmitted through reflective polarization plate 40 and leaks out due to the nature of reflective polarization plate 40.

By contrast, in this embodiment, the polarization direction of the emission light from display surface 34 of display element 18 is first direction d1. This can prevent part of the emission light from display surface 34 of display element 18 from being transmitted through reflective polarization plate 40 and leaking out when driver 14 sees display device 2 from diagonally below.

As indicated by a solid line in FIG. 5, display surface 34 of display element 18 is preferably angled with respect to the eyes of driver 14. Specifically, perpendicular line 36 to display surface 34 of display element 18 is preferably not parallel to optical path L of the emission light entering the eyes of driver 14 through dust cover 32. For convenience of description, FIG. 5 shows the eyes of driver 14 at the same height as display surface 34 of display element 18. The eyes of driver 14, however, are actually located below display surface 34 of display element 18.

Suppose that display surface 34 of display element 18 is not angled with respect to the eyes of driver 14 (i.e., display surface 34 is inclined with respect to the perpendicular direction to face diagonally downward) as indicated by a dashed and double-dotted line in FIG. 5. As indicated by arrow P in FIG. 5, outside light, for example headlights of the following vehicle, is transmitted through components such as dust cover 32 and reflected off display surface 34 of display element 18. Reflected outside light P1 is transmitted again through the components such as dust cover 32 and enters the eyes of driver 14. Consequently, the outside light is likely to be reflected in the rear image displayed on display surface 34 of display element 18.

By contrast, in this embodiment, display surface 34 of display element 18 is angled with respect to the eyes of driver 14. Reflected outside light P2 reflected off display surface 34 of display element 18 is directed toward ceiling 8 and not likely to enter the eyes of driver 14. Consequently, the outside light can be prevented from being reflected in the rear image displayed on display surface 34 of display element 18.

As described above, in this embodiment, the emission direction of the emission light from display surface 34 is inclined upward with respect to perpendicular line 36 to display surface 34. If the emission direction is not inclined, outside light entering from a position at substantially the same height as the viewpoint of driver 14 follows the reverse optical path and reaches display surface 34. The reflected outside light then follows the normal optical path and reaches the viewpoint of driver 14 while being superimposed on the light of the image emitted from display surface 34 (the rear image). Consequently, the outside light from outside the vehicle is likely to be reflected in the rear image. In this embodiment, because the light of the rear image is emitted in the direction inclined upward with respect to perpendicular line 36 to display surface 34, the reflected outside light is less likely to be superimposed on the rear image. This can prevent reflections in the rear image displayed on display surface 34 of display element 18.

Further, as described above, first mirror 22 in this embodiment is inclined with respect to the horizontal direction. This can also prevent reflections in the rear image displayed on display surface 34 of display element 18.

1-4. Advantageous Effect

Figure 6:
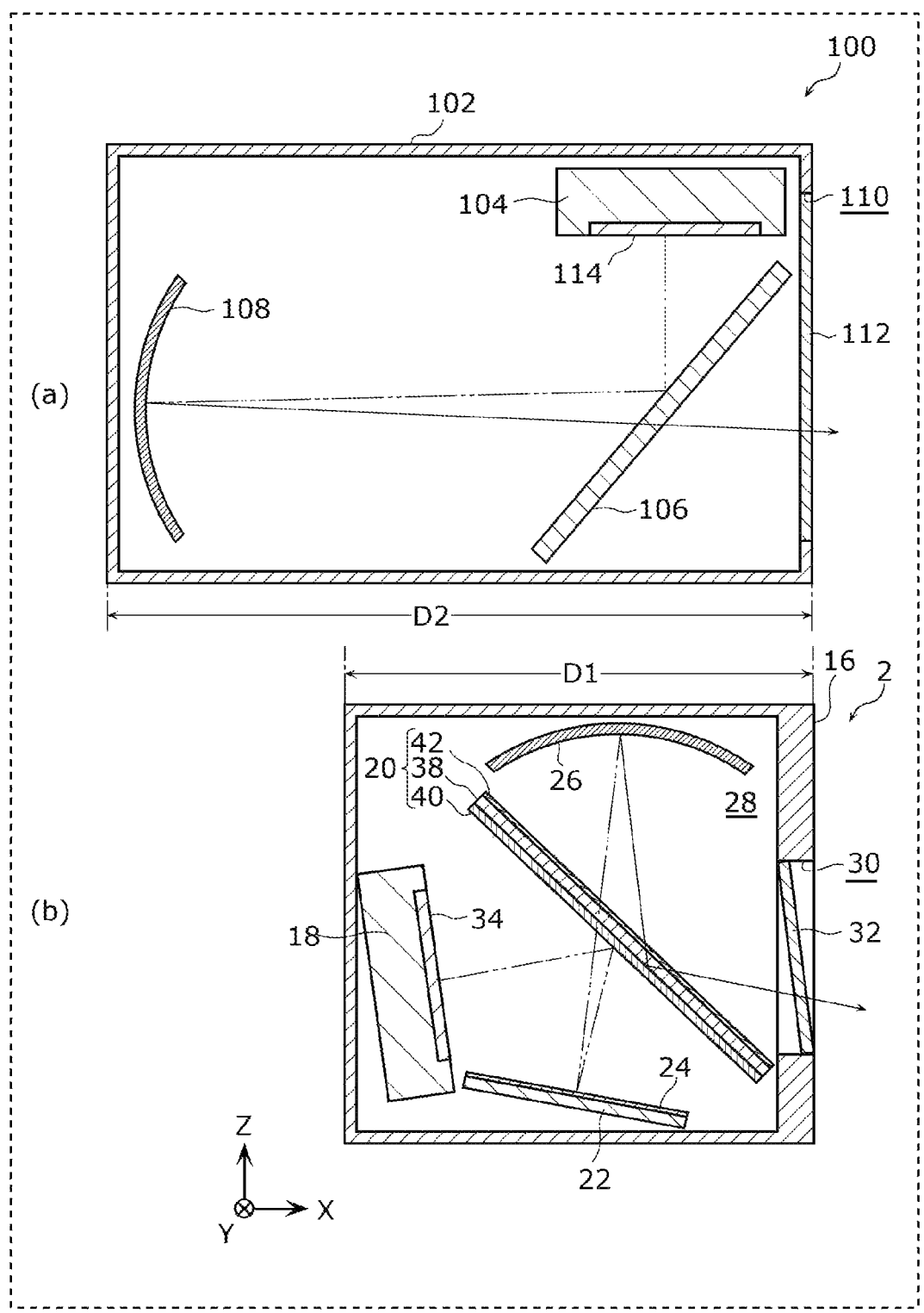
FIG. 6 is a diagram for comparing the display device according to Embodiment 1 with a display device according to a comparative example.

With reference to FIG. 6, an advantageous effect obtained from display device 2 according to Embodiment 1 will be described below by comparing display device 2 according to Embodiment 1 with display device 100 according to a comparative example. FIG. 6 is a diagram for comparing display device 2 according to Embodiment 1 with display device 100 according to the comparative example.

As shown in (a) in FIG. 6, display device 100 according to the comparative example includes: case 102; display element 104 such as a liquid crystal display; polarization element 106; and concave mirror 108.

Case 102 houses display element 104, polarization element 106, and concave mirror 108. Dust cover 112 is disposed in opening 110 in case 102. Display element 104 has display surface 114 for displaying a rear image and has a λ/4 plate disposed on the outermost surface.

Polarization element 106 is disposed to oppose display surface 114 of display element 104 and is inclined with respect to display surface 114. Polarization element 106 is formed by stacking a reflective polarization plate and a λ/4 plate.

Concave mirror 108 is a concave mirror having a free-form surface and is disposed to oppose polarization element 106.

Emission light from display surface 114 of display element 104 is reflected off polarization element 106 and reaches concave mirror 108. The emission light reflected off concave mirror 108 is transmitted through polarization element 106 and dust cover 112 to enter the driver's eyes.

In the above manner, the emission light from display surface 114 of display element 104 is (i) reflected off polarization element 106 and (ii) reflected off concave mirror 108 to enter the driver's eyes. That is, the emission light from display surface 114 of display element 104 is reflected in case 102 twice in total before entering the driver's eyes.

Here, the visual distance from the driver's eyes to the display position of a virtual image of a rear image is determined by the optical path length (the distance indicated by a dashed and double-dotted line in (a) in FIG. 6) along which the emission light from display surface 114 of display element 104 travels to concave mirror 108 via polarization element 106. To ensure a sufficient visual distance, therefore, the optical path length needs to be set at a predetermined length. This poses a problem of correspondingly increased distances between the components (display element 104, polarization element 106, and concave mirror 108), resulting in large case 102.

By contrast, as shown in (b) in FIG. 6, in display device 2 according to Embodiment 1, emission light from display surface 34 of display element 18 is (i) reflected off reflective polarization plate 40, (ii) reflected off reflection surface 44 of first mirror 22, (iii) reflected off reflection surface 46 of second mirror 26, and (iv) reflected off reflective polarization plate 40 to enter the eyes of driver 14. That is, the emission light from display surface 34 of display element 18 is reflected in case 102 four times in total before entering the eyes of driver 14.

Thus, while being reflected off the mirrors (first mirror 22 and second mirror 26) before exiting from case 16 through dust cover 32, the emission light from display surface 34 of display element 18 is reflected off polarization element 20 twice and transmitted through polarization element 20 once. Specifically, the emission light is reflected off polarization element 20, then reflected off first mirror 22, then transmitted through polarization element 20, then reflected off second mirror 26, and again reflected off polarization element 20.

Because the emission light from display surface 34 is reflected off polarization element 20 twice and transmitted through polarization element 20 once, the number of optical paths leading to polarization element 20 can be increased to three in total. This can increase the optical path length, thereby reducing the size of case 16 while ensuring a sufficient visual distance. Further, reflection light paths can be provided on both sides of polarization element 20. The emission light can be transmitted through polarization element 20 to transfer from one reflection light path to the other reflection light path. Because the emission light follows one reflection light path and then transfers to and follows the other reflection light path, the optical path length can be correspondingly increased. This can reduce the entire device size while ensuring a sufficient visual distance.

In addition, short distances can be achieved between the components (display element 18, polarization element 20, first mirror 22, and second mirror 26) for setting the above predetermined length as the optical path length (the distance indicated by a dashed and double-dotted line in (b) in FIG. 6) along which the emission light from display surface 34 of display element 18 travels to second mirror 26 via polarization element 20 and first mirror 22. This can reduce the size of case 16.

That is, although the optical path length in (a) in FIG. 6 is the same as the optical path length in (b) in FIG. 6, front-rear dimension D1 of case 16 of display device 2 according to Embodiment 1 is smaller than front-rear dimension D2 of case 102 of display device 100 according to the comparative example. Display device 2 according to Embodiment 1 can thus provide an advantageous effect of achieving a small entire device size while ensuring a sufficient visual distance.

Embodiment 2

2-1. Configuration of Display Device

Figure 7:
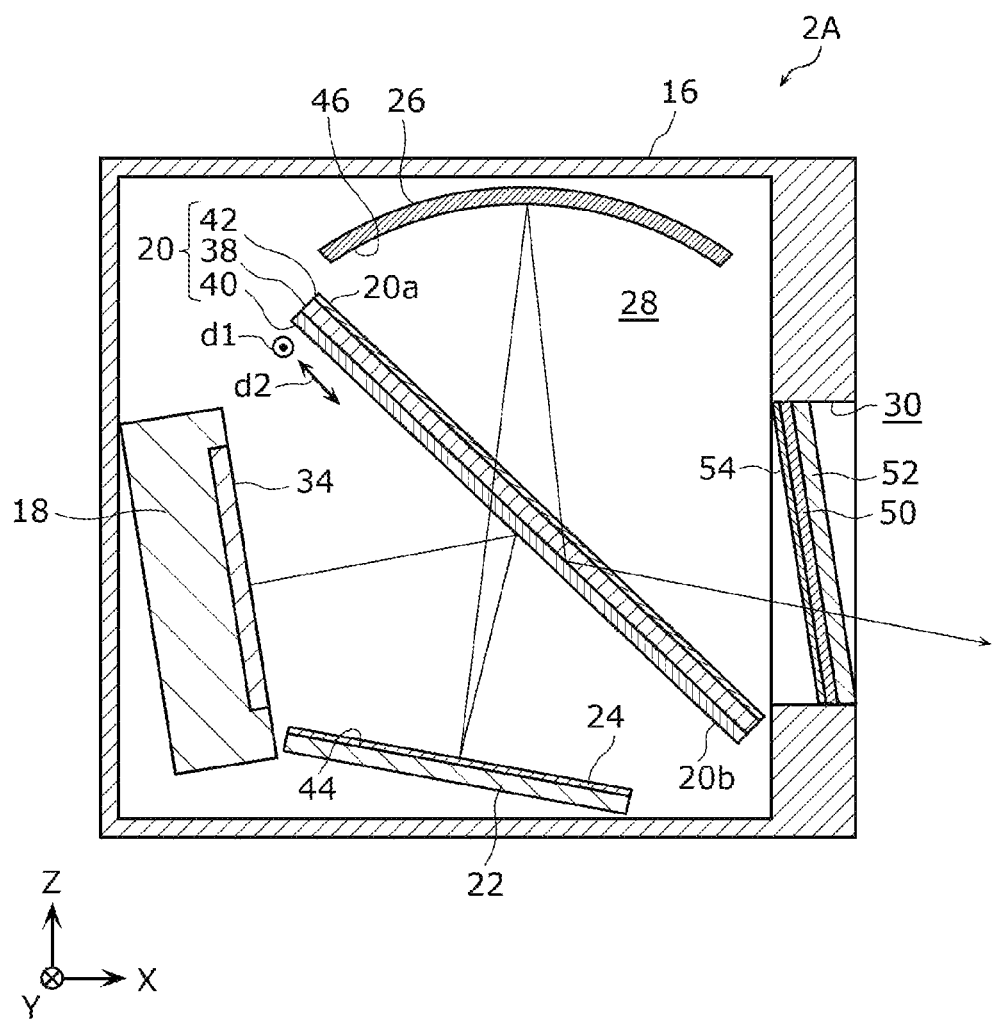
FIG. 7 is a sectional view of a display device according to Embodiment 2.

The configuration of display device 2A according to Embodiment 2 will be described with reference to FIG. 7. FIG. 7 is a sectional view of display device 2A according to Embodiment 2. In the following embodiments, the same components as in Embodiment 1 above will be given the same symbols and not be described.

As shown in FIG. 7, instead of dust cover 32 described in Embodiment 1 above, display device 2A according to Embodiment 2 includes glass board 50, transmissive polarization plate 52, and third λ/4 plate 54. Third λ/4 plate 54, glass board 50, and transmissive polarization plate 52 are stacked in this order from the side closer to display surface 34 of display element 18, and disposed in opening 30 in case 16. Third λ/4 plate 54, glass board 50, and transmissive polarization plate 52 block opening 30 in case 16 to function as dust cover 32 described in Embodiment 1 above. It is to be noted that, in the embodiments and variations to be described below, dust cover 32 may be replaced with glass board 50, transmissive polarization plate 52, and third λ/4 plate 54 as in this embodiment.

Glass board 50 is a board for supporting transmissive polarization plate 52 and third λ/4 plate 54 and is made of, for example, transparent glass. Third λ/4 plate 54 is on a first surface of glass board 50 (the surface opposing second λ/4 plate 42 of polarization element 20). Transmissive polarization plate 52 is on a second surface of glass board 50 opposite to the first surface. Glass board 50 is inclined with respect to the plane perpendicular to the emission light such that the lower side is closer to driver 14 (see FIG. 1).

Of the light reaching transmissive polarization plate 52, transmissive polarization plate 52 absorbs linearly polarized light components in first direction d1 and transmits linearly polarized light components in second direction d2. That is, the absorption axis and the transmission axis of transmissive polarization plate 52 are in first direction d1 and second direction d2, respectively, which are orthogonal to each other.

Third λ/4 plate 54 is a phase difference plate for converting the light reaching third λ/4 plate 54 from linearly polarized light into circularly polarized light (or from circularly polarized light into linearly polarized light). Third λ/4 plate 54 has a function of creating a phase difference of one fourth of wavelength λ, (i.e., a phase difference of 90°) between linearly polarized light components orthogonal to each other in the light reaching third λ/4 plate 54. Third λ/4 plate 54 is disposed to cover the first surface of glass board 50. That is, third λ/4 plate 54 is disposed between second λ/4 plate 42 of polarization element 20 and transmissive polarization plate 52.

2-2. Operations of Display Device

Figure 8:
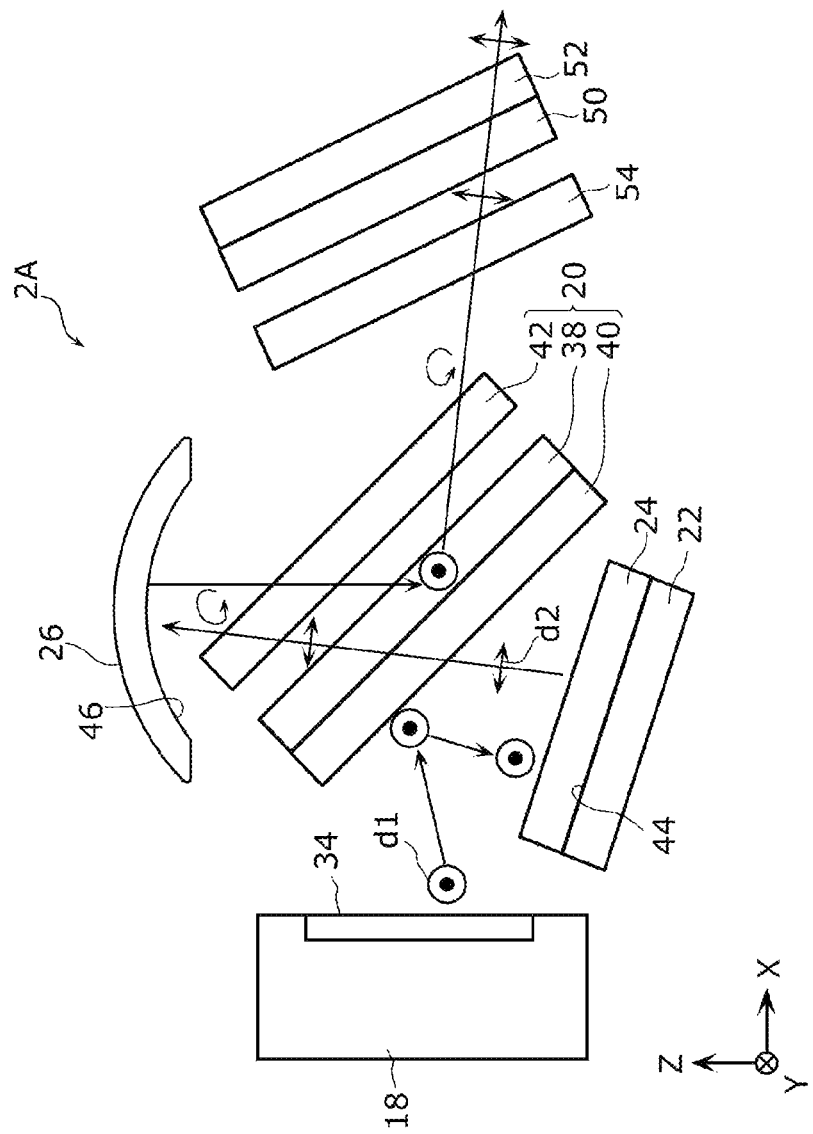
FIG. 8 is a schematic diagram for describing operations of the display device according to Embodiment 2.

Now, operations of display device 2A according to Embodiment 2 will be described with reference to FIG. 8. FIG. 8 is a schematic diagram for describing the operations of display device 2A according to Embodiment 2.

As shown in FIG. 8, the emission light from display surface 34 of display element 18 is, as in Embodiment 1 above, (i) reflected off reflective polarization plate 40, (ii) reflected off reflection surface 44 of first mirror 22, (iii) reflected off reflection surface 46 of second mirror 26, and (iv) reflected off reflective polarization plate 40. The emission light reflected off reflective polarization plate 40 is transmitted through glass board 38 and second λ/4 plate 42 and reaches third λ/4 plate 54.

The emission light reaching third λ/4 plate 54 is transmitted through third λ/4 plate 54 and glass board 50 and reaches transmissive polarization plate 52. At this point, the emission light transmitted through third λ/4 plate 54 is converted from the circularly polarized light into linearly polarized light in second direction d2.

The polarization direction of the emission light reaching transmissive polarization plate 52 is second direction d2, which is also the direction of the transmission axis of transmissive polarization plate 52. Therefore, the emission light reaching transmissive polarization plate 52 is transmitted through transmissive polarization plate 52. The emission light transmitted through transmissive polarization plate 52 enters the eyes of driver 14.

2-3. Advantageous Effect

In this embodiment, transmissive polarization plate 52 and third λ/4 plate 54 are disposed in opening 30 in case 16. Consequently, stray light (light that does not contribute to displaying virtual image 48 shown in FIG. 1) generated in case 16 can be attenuated when the stray light is transmitted through transmissive polarization plate 52. This can prevent reflections in the rear image displayed on display surface 34 of display element 18.

Further, glass board 50 is inclined with respect to the plane perpendicular to the emission light such that the lower side is closer to driver 14. Consequently, outside light reaching and reflected off the surface of transmissive polarization plate 52 can be directed toward ceiling 8 (see FIG. 1) to prevent reflections in the rear image.

Although transmissive polarization plate 52 is used in this embodiment, this is not limiting. Rather, transmissive polarization plate 52 may be replaced with a reflective polarization plate. Further, an adjustment mechanism may be provided to allow entire case 16 to be rotated upward/ downward and rightward/leftward, and displaying the rear image may be enabled and disabled. While displaying the rear image is disabled, entire case 16 may be rotated upward/downward and rightward/leftward so that the reflected image of the area behind vehicle 4 (see FIG. 1) faces driver 14. In this manner, the device can be switched to normal optical mirror mode.

2-4. Variation

Figure 9:
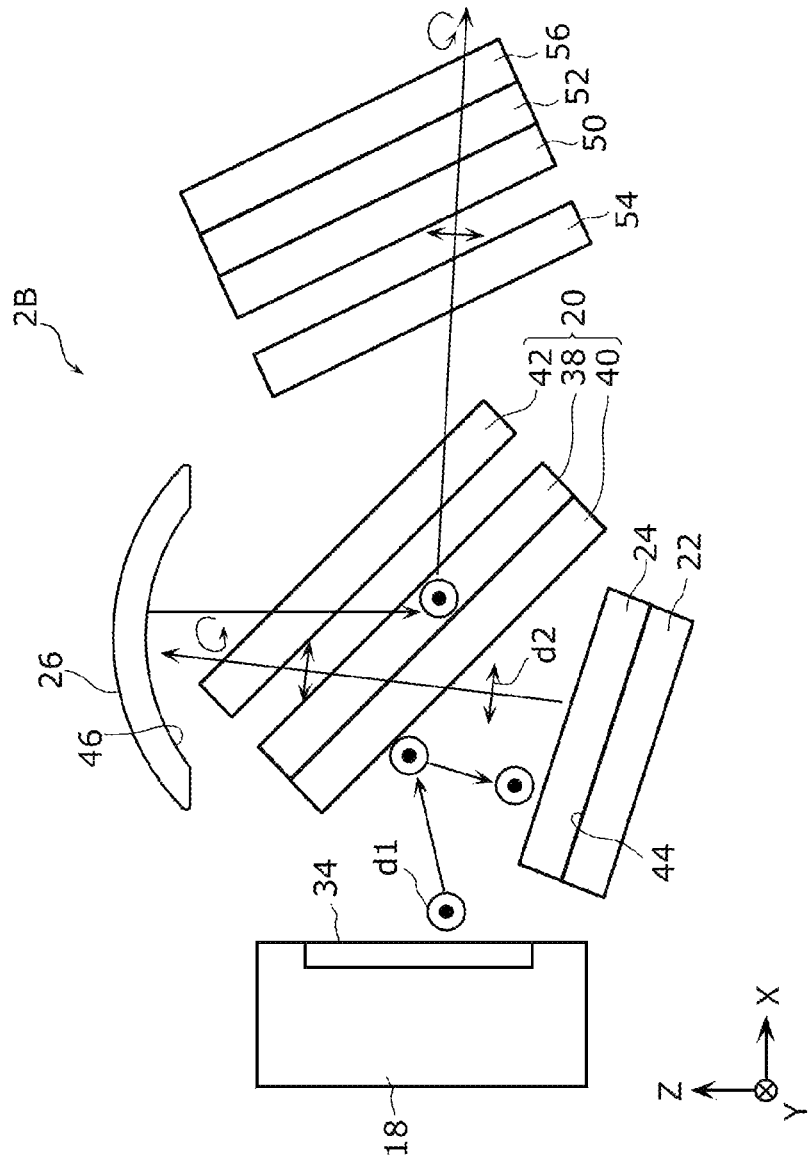
FIG. 9 is a schematic diagram for describing operations of a display device according a variation of Embodiment 2.

The configuration and operations of display device 2B according to a variation of Embodiment 2 will be described with reference to FIG. 9. FIG. 9 is a schematic diagram for describing the operations of display device 2B according to the variation of Embodiment 2.

As shown in FIG. 9, display device 2B according to the variation of Embodiment 2 includes fourth λ/4 plate 56 in addition to the above-described components. Third λ/4 plate 54, glass board 50, transmissive polarization plate 52, and fourth λ/4 plate 56 are stacked in this order from the side closer to display surface 34 of display element 18.

Fourth λ/4 plate 56 is a phase difference plate for converting the light reaching fourth λ/4 plate 56 from linearly polarized light into circularly polarized light (or from circularly polarized light into linearly polarized light). Fourth λ/4 plate 56 has a function of creating a phase difference of one fourth of wavelength λ, (i.e., a phase difference of 90°) between linearly polarized light components orthogonal to each other in the light reaching fourth λ/4 plate 56.

As shown in FIG. 9, the emission light transmitted through transmissive polarization plate 52 is transmitted through fourth λ/4 plate 56. The emission light transmitted through fourth λ/4 plate 56 is converted from the linearly polarized light in second direction d2 into circularly polarized light and enters the eyes of driver 14 (see FIG. 1).

Thus, if driver 14 wears, for example, polarized sunglasses, the emission light transmitted through fourth λ/4 plate 56 can still enter the eyes of driver 14.

Embodiment 3

3-1. Configuration of Display Device

Figure 10:
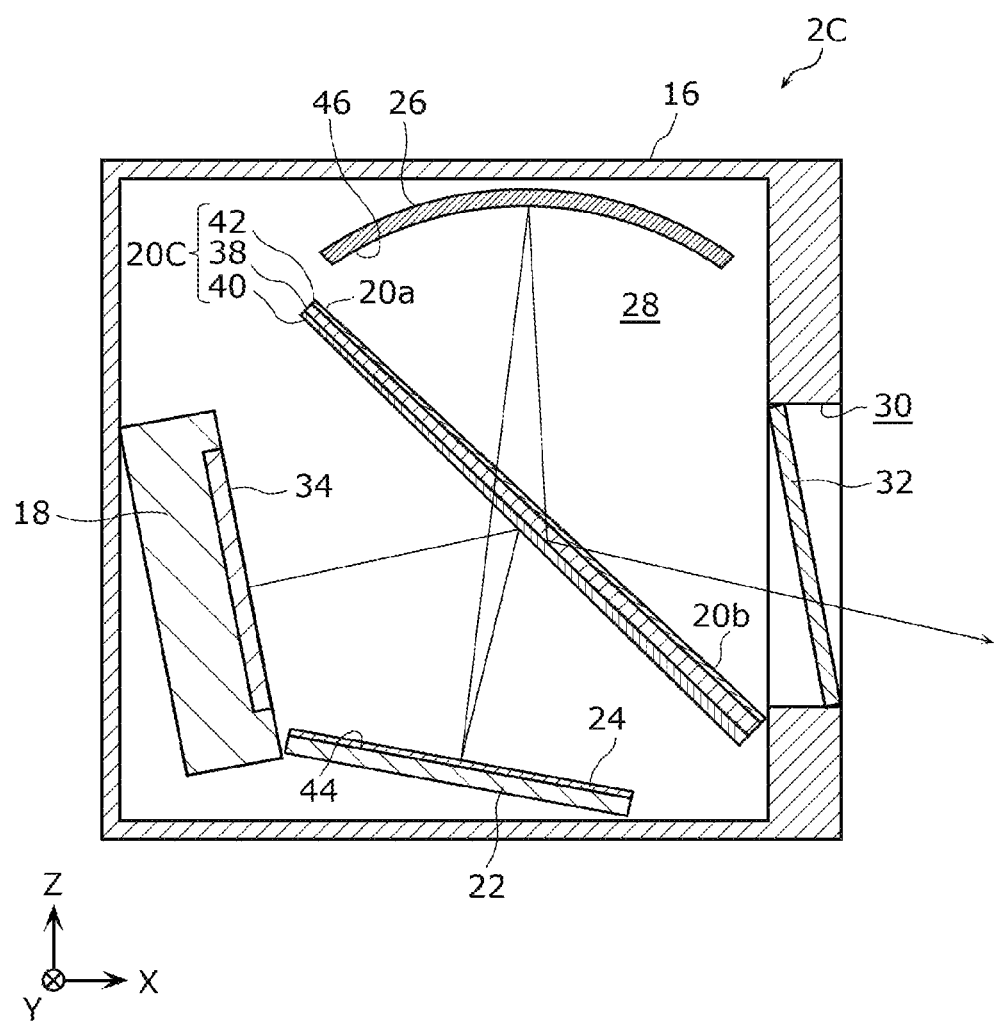
FIG. 10 is a sectional view of a display device according to Embodiment 3.

The configuration of display device 2C according to Embodiment 3 will be described with reference to FIG. 10. FIG. 10 is a sectional view of display device 2C according to Embodiment 3.

As shown in FIG. 10, in display device 2C according to Embodiment 3, polarization element 20C has a configuration different from that in Embodiment 1. Specifically, polarization element 20C has a wedge-shaped cross section. Upper end part 20a of polarization element 20C (the end part closer to second mirror 26) is thinner than lower end part 20b of polarization element 20C (the end part closer to first mirror 22).

3-2. Advantageous Effect

Figure 11:
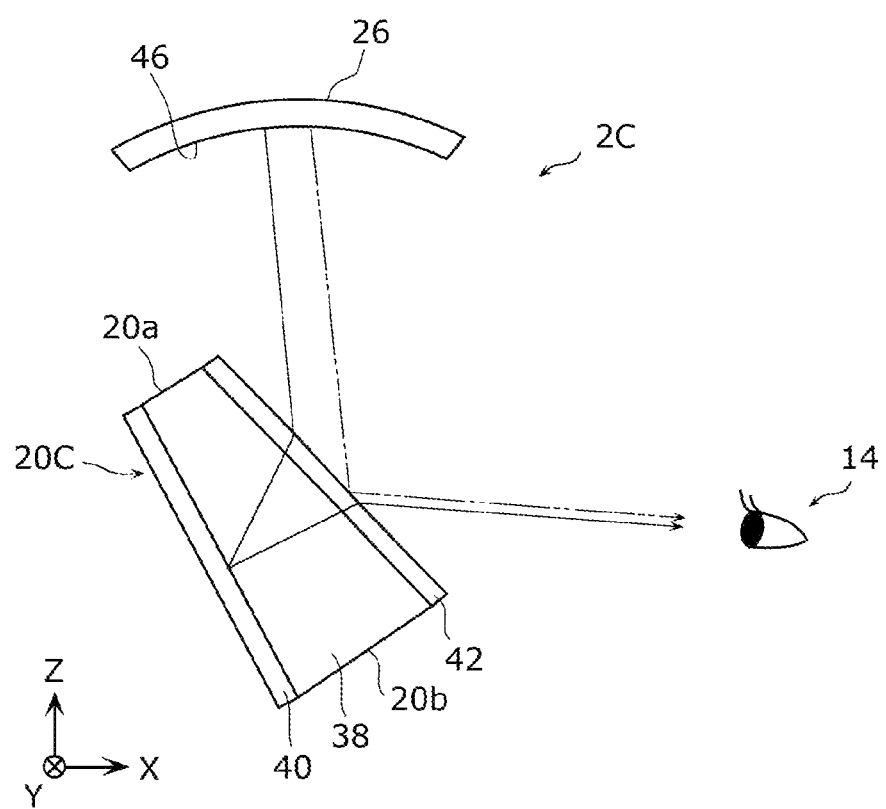
FIG. 11 is a schematic diagram for describing an advantageous effect obtained from the display device according to Embodiment 3.
Figure 12:
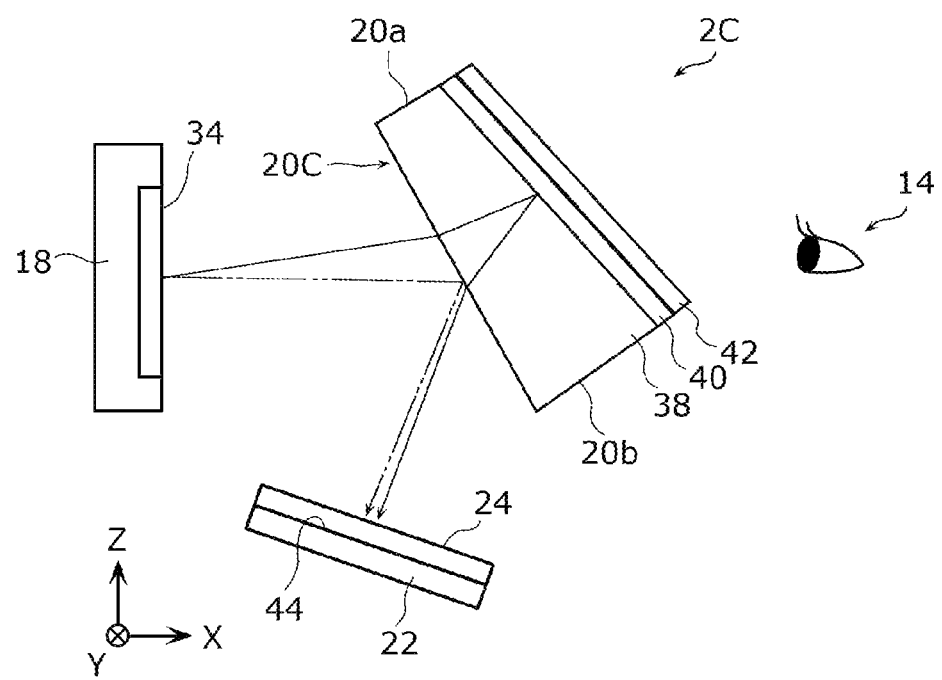
FIG. 12 is a schematic diagram for describing the advantageous effect obtained from the display device according to Embodiment 3.

An advantageous effect obtained from display device 2C according to Embodiment 3 will be described with reference to FIGS. 11 and 12. FIGS. 11 and 12 are schematic diagrams for describing an advantageous effect obtained from display device 2C according to Embodiment 3.

As indicated by a solid line arrow in FIG. 11, most of the emission light reflected off reflection surface 46 of second mirror 26 (hereafter referred to as "display light") is transmitted through second λ/4 plate 42 of polarization element 20C and reflected off the surface of reflective polarization plate 40. The display light is then transmitted again through polarization element 20C and enters the eyes of driver 14. As indicated by a dashed and double-dotted line arrow in FIG. 11, part of the emission light reflected off reflection surface 46 of second mirror 26 (hereafter referred to as "surface-reflected light") is reflected off the surface of second λ/4 plate 42 and enters the eyes of driver 14.

At this point, because polarization element 20C has a wedge-shaped cross section, the surface-reflected light reflected off the surface of second λ/4 plate 42 of polarization element 20C substantially aligns with the display light transmitted through polarization element 20C and reflected off reflective polarization plate 40. This can prevent a phenomenon in which the rear image appears as a double image due to the surface-reflected light superimposed on the display light with misalignment therebetween.

In the case described with reference to FIG. 11, polarization element 20C has reflective polarization plate 40 and second λ/4 plate 42 on the opposite sides of glass board 38. As described in Embodiment 1 above, polarization element 20C may also have reflective polarization plate 40 and second λ/4 plate 42 stacked in this order on one side of glass board 38. This will be described with reference to FIG. 12.

As indicated by a solid line arrow in FIG. 12, most of the emission light from display surface 34 of display element 18 (hereafter referred to as "display light") is transmitted through glass board 38 of polarization element 20C and reflected off the surface of reflective polarization plate 40 of polarization element 20C. The display light is then transmitted again through glass board 38 of polarization element 20C and reaches reflection surface 44 of first mirror 22. As indicated by a dashed and double-dotted line arrow in FIG. 12, part of the emission light from display surface 34 of display element 18 (hereafter referred to as "surface-reflected light") is reflected off the surface of glass board 38 of polarization element 20C and reaches reflection surface 44 of first mirror 22.

At this point, because polarization element 20C has a wedge-shaped cross section, the display light reflected off the surface of reflective polarization plate 40 of polarization element 20C substantially aligns with the surface-reflected light reflected off the surface of glass board 38 of polarization element 20C. As described above, this can prevent a phenomenon in which the rear image appears as a double image due to the surface-reflected light superimposed on the display light with misalignment therebetween.

Although polarization element 20C in Embodiment 3 has upper end part 20a thinner than lower end part 20b, this is not limiting. Rather, polarization element 20C may have upper end part 20a thicker than lower end part 20b according to factors such as the positioning of polarization element 20C and the location of display device 2C. Such a configuration can still provide the above-described advantageous effect. Thus, upper end part 20a and lower end part 20b of polarization element 20C may be different in thickness.

Embodiment 4

4-1. Configuration of Display Device

Figure 13:
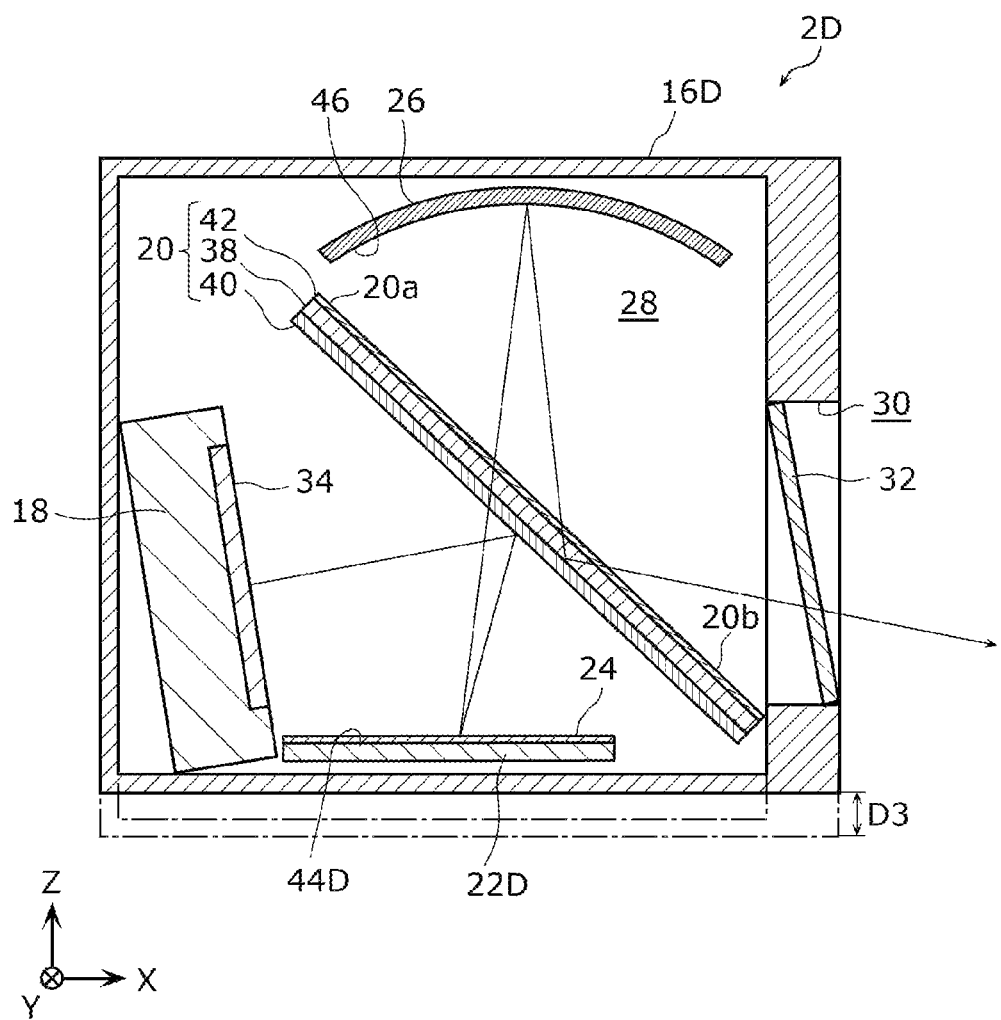
FIG. 13 is a sectional view of a display device according to Embodiment 4.
Figure 14:
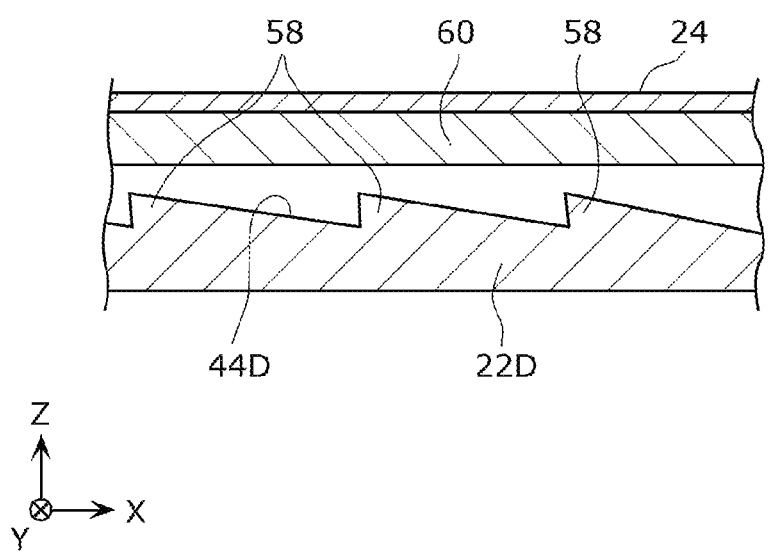
FIG. 14 is an enlarged sectional view of part of a first mirror in the display device according to Embodiment 4.

The configuration of display device 2D according to Embodiment 4 will be described with reference to FIGS. 13 and 14. FIG. 13 is a sectional view of display device 2D according to Embodiment 4. FIG. 14 is an enlarged sectional view of part of first mirror 22D in display device 2D according to Embodiment 4.

As shown in FIGS. 13 and 14, in display device 2D according to Embodiment 4, first mirror 22D has a configuration different from that in Embodiment 1. Specifically, first mirror 22D is a Fresnel mirror and has Fresnel reflection surface 44D. As shown in FIG. 14, prism parts 58 longitudinally extending in the right-left direction (the Y-axis direction) are arranged in the front-rear direction (the X-axis direction) on reflection surface 44D. First mirror 22D is disposed parallel to the horizontal direction such that reflection surface 44D faces vertically upward.

Glass board 60 for supporting first λ/4 plate 24 is disposed between first mirror 22D and first λ/4 plate 24.

4-2. Advantageous Effect

In Embodiment 1 above, first mirror 22 is a plane mirror. To control the direction of the emission light reflected off first mirror 22 to be a particular direction, therefore, first mirror 22 needs to be inclined with respect to the horizontal direction.

By contrast, in this embodiment, first mirror 22D is Fresnel mirror. Therefore, although first mirror 22D is disposed parallel to the horizontal direction, the direction of the emission light reflected off first mirror 22D can be controlled to be the particular direction.

Consequently, as shown in FIG. 13, compared with Embodiment 1 above in which first mirror 22 is inclined with respect to the horizontal direction, the top-bottom dimension of case 16D can be reduced by dimension D3. This allows more effective reduction of the entire device size. Because case 16D is shortened in its lower part, the view toward the front can be correspondingly widened.

4-3. Variation

Figure 15:
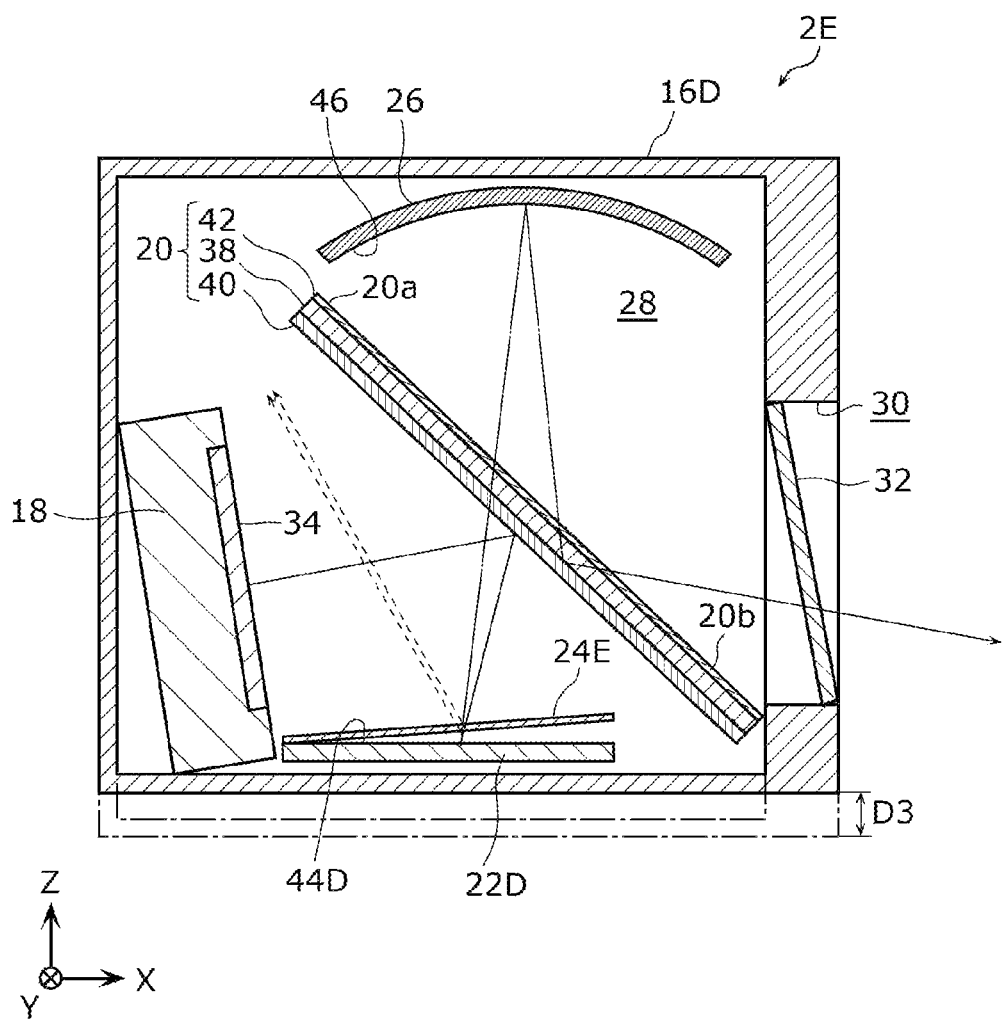
FIG. 15 is a sectional view of a display device according to a variation of Embodiment 4.
Figure 16:
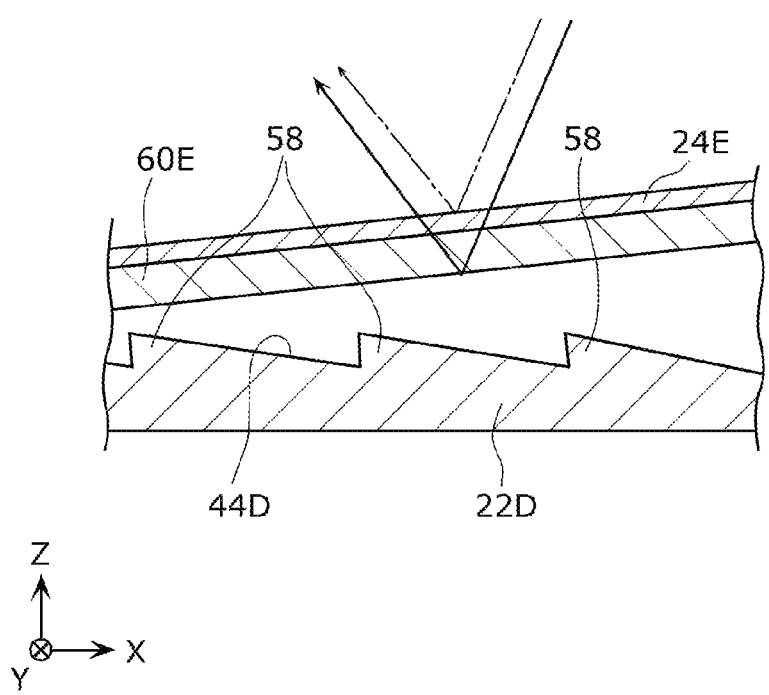
FIG. 16 is an enlarged sectional view of part of a first mirror in the display device according to the variation of Embodiment 4.

Now, display device 2E according to a variation of Embodiment 4 will be described with reference to FIGS. 15 and 16. FIG. 15 is a sectional view of display device 2E according to the variation of Embodiment 4. FIG. 16 is an enlarged sectional view of part of first mirror 22D in display device 2E according to the variation of Embodiment 4.

As shown in FIGS. 15 and 16, first λ/4 plate 24E and glass board 60E in this variation are inclined forward with respect to first mirror 22D. Alternatively, first λ/4 plate 24E and glass board 60E may be inclined rearward with respect to first mirror 22D.

As indicated by a solid line arrow in FIG. 16, part of the emission light reflected off reflective polarization plate 40 (see FIG. 15) is transmitted through first λ/4 plate 24E and glass board 60E, then reflected off the surface of glass board 60E opposite to first λ/4 plate 24E, and transmitted again through glass board 60E and first λ/4 plate 24E. As indicated by a dashed and double-dotted line arrow in FIG. 16, another part of the emission light reflected off reflective polarization plate 40 is reflected off first λ/4 plate 24E.

Here, first λ/4 plate 24E and glass board 60E are inclined forward with respect to first mirror 22D. This allows the reflected light reflected off the incident surface of first λ/4 plate 24E and the reflected light reflected off glass board 60E to significantly deviate from the normal optical path, as indicated by dashed line arrows in FIG. 15. Consequently, a phenomenon in which the rear image appears as a double image can be prevented.

Embodiment 5

5-1. Configuration of Display Device

Figure 17:
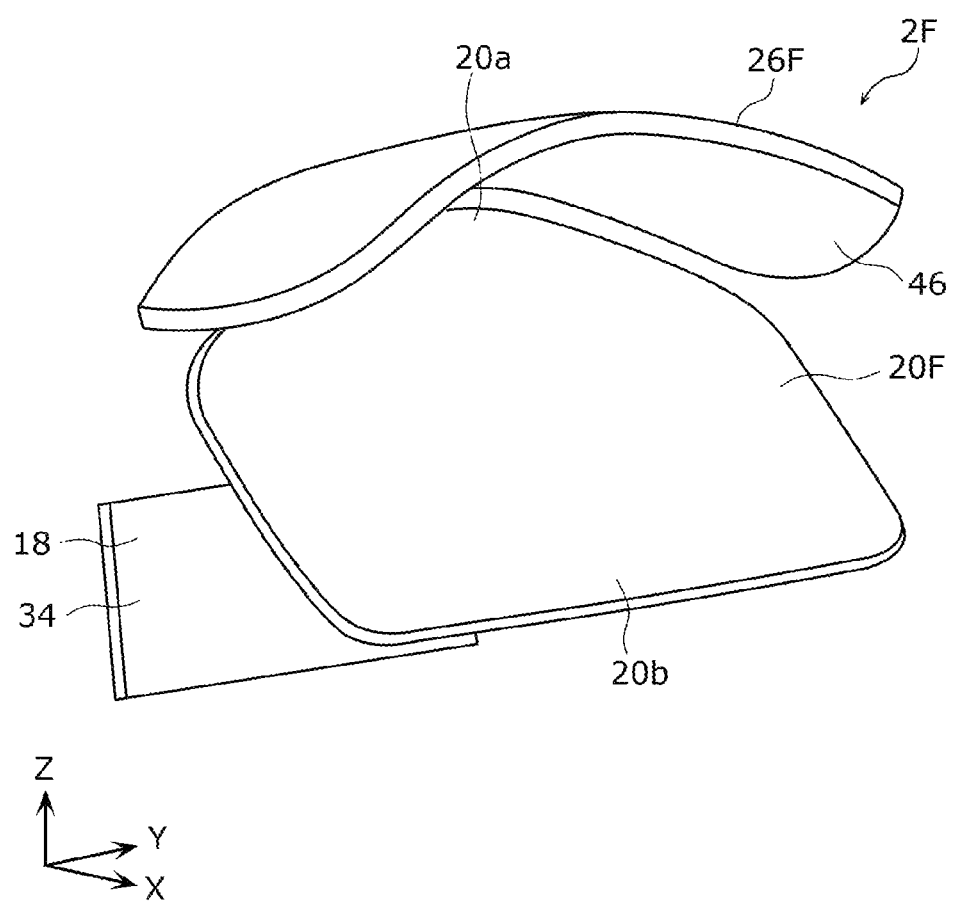
FIG. 17 is a perspective view of part of the configuration of a display device according to Embodiment 5.
Figure 18:
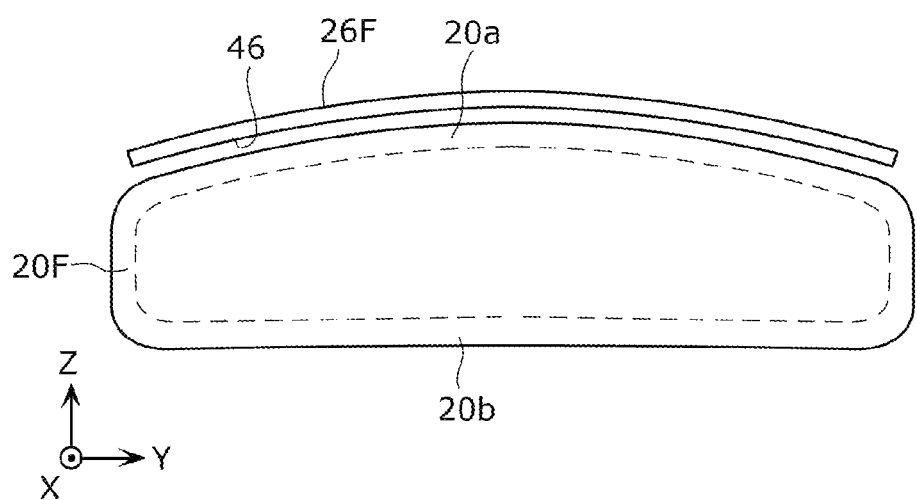
FIG. 18 is a front view of a polarization element and a second mirror in the display device according to Embodiment 5.
Figure 19:
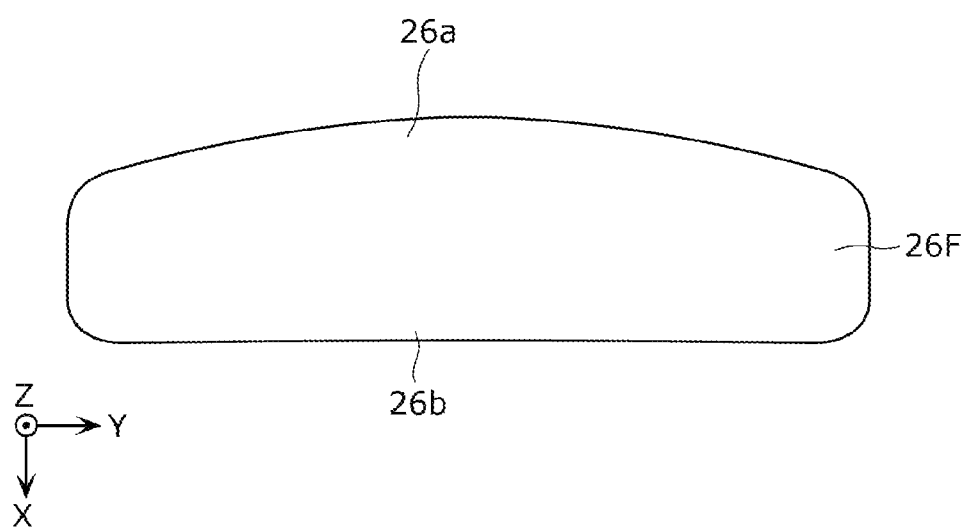
FIG. 19 is a top view of the second mirror in the display device according to Embodiment 5.

The configuration of display device 2F according to Embodiment 5 will be described with reference to FIGS. 17 to 19. FIG. 17 is a perspective view of part of the configuration of display device 2F according to Embodiment 5. FIG. 18 is a front view of polarization element 20F and second mirror 26F in display device 2F according to Embodiment 5. FIG. 19 is a top view of second mirror 26F in display device 2F according to Embodiment 5. For convenience of description, first mirror 22 is not shown in FIG. 17.

As shown in FIGS. 17 and 18, in display device 2F according to Embodiment 5, polarization element 20F and second mirror 26F have configurations different from those in Embodiment 1 above. Specifically, first, in FIG. 18, a dashed line indicates a front view of second mirror 26F reflected on polarization element 20F. As the dashed line indicates, the upper end part of second mirror 26F in the front view is curved to have a convex shape. This allows second mirror 26F to be disposed in close proximity to polarization element 20F as shown in FIG. 17, thereby more effectively reducing the size of entire display device 2F.

Further, upper end part 20a of polarization element 20F closer to second mirror 26F is curved to have a convex shape corresponding to the shape of the concave surface (on which reflection surface 46 is located) of second mirror 26F. Lower end part 20b of polarization element 20F is linearly shaped. Upper end part 20a of polarization element 20F can therefore be disposed in close proximity to the concave surface of second mirror 26F to more effectively reduce the entire device size. This can reduce the height of the part above opening 30 (see FIG. 2) (the apparent width of the upper side of the frame) in display device 2F viewed from driver 14 (see FIG. 1). In particular, in FIGS. 17 and 18, if the configuration in FIG. 3A reversed in the top-bottom direction (the Z-axis direction) is suspended from the ceiling or the upper part of the windshield of vehicle 4 (see FIG. 1), the height of the part below opening 30 (the width of the lower side of the frame) in display device 2F can be reduced. This can reduce the area in the front blocked by the lower side of the frame.

In the top view shown in FIG. 19, front end part 26a of second mirror 26F closer to display element 18 is curved to have a convex shape corresponding to the shape of upper end part 20a of polarization element 20F. In the top view shown in FIG. 19, rear end part 26b of second mirror 26F is linearly shaped. This allows the entire reflected image from second mirror 26F to be projected on polarization element 20F, as indicated by the dashed line in FIG. 18.

Embodiment 6

6-1. Configuration of Display Device

Figure 20:
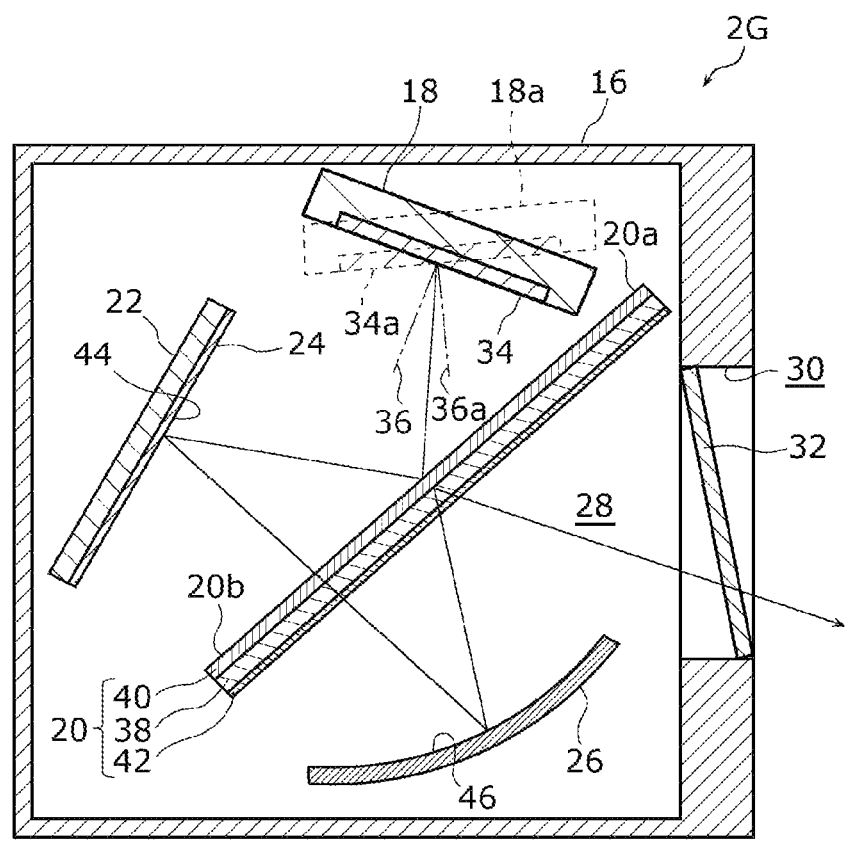
FIG. 20 is a sectional view of a display device according to Embodiment 6.

The configuration of display device 2G according to Embodiment 6 will be described with reference to FIG. 20. FIG. 20 is a sectional view of display device 2G according to Embodiment 6. In FIG. 20, the same components as in FIG. 3A are given the same symbols and will not be described in detail.

As shown in FIG. 20, as compared with the configuration in FIG. 3A, this embodiment is characterized in that the positions of display element 18 and first mirror 22 are interchanged. Specifically, when viewed from opening 30, display element 18 is disposed in the upper part (the positive side on the Z axis) of case 16. Similarly, first mirror 22 is disposed in the innermost part (the negative side on the X axis) of case 16, and second mirror 26 is disposed in the lower part (the negative side on the Z axis) of case 16. Polarization element 20, disposed between display element 18 and second mirror 26, is inclined such that upper end part 20a of polarization element 20 (the end part on the positive side on the Z axis) is closer to opening 30.

Again, in this embodiment, while being reflected off the mirrors (first mirror 22 and second mirror 26) before exiting from case 16 through dust cover 32, the emission light from display surface 34 of display element 18 is reflected off polarization element 20 twice and transmitted through polarization element 20 once. Specifically, the angles of display element 18 and first mirror 22 are adjusted so that the emission light is reflected off polarization element 20, then reflected off first mirror 22, then transmitted through polarization element 20, then reflected off second mirror 26, and again reflected off polarization element 20.

The above configuration can reduce the entire device size and also allows heat-producing display element 18 to be disposed in the upper part of case 16 (the positive side in the Z-axis direction). The top of case 16 therefore releases heat produced by display element 18 and heat of air heated by display element 18. This can prevent thermal influence on the mirrors and polarization element 20.

In the configuration in FIG. 20, the emission light from display surface 34 of display element 18 is emitted in a direction inclined toward dust cover 32 with respect to perpendicular line 36 to display surface 34. Alternatively, display element 18a may be disposed as indicated by dashed lines in FIG. 20, so that the emission light from display surface 34a may be emitted in a direction inclined toward first mirror 22 with respect to perpendicular line 36a to display surface 34a.

Embodiment 7

7-1. Configuration of Display Device

Figure 21:
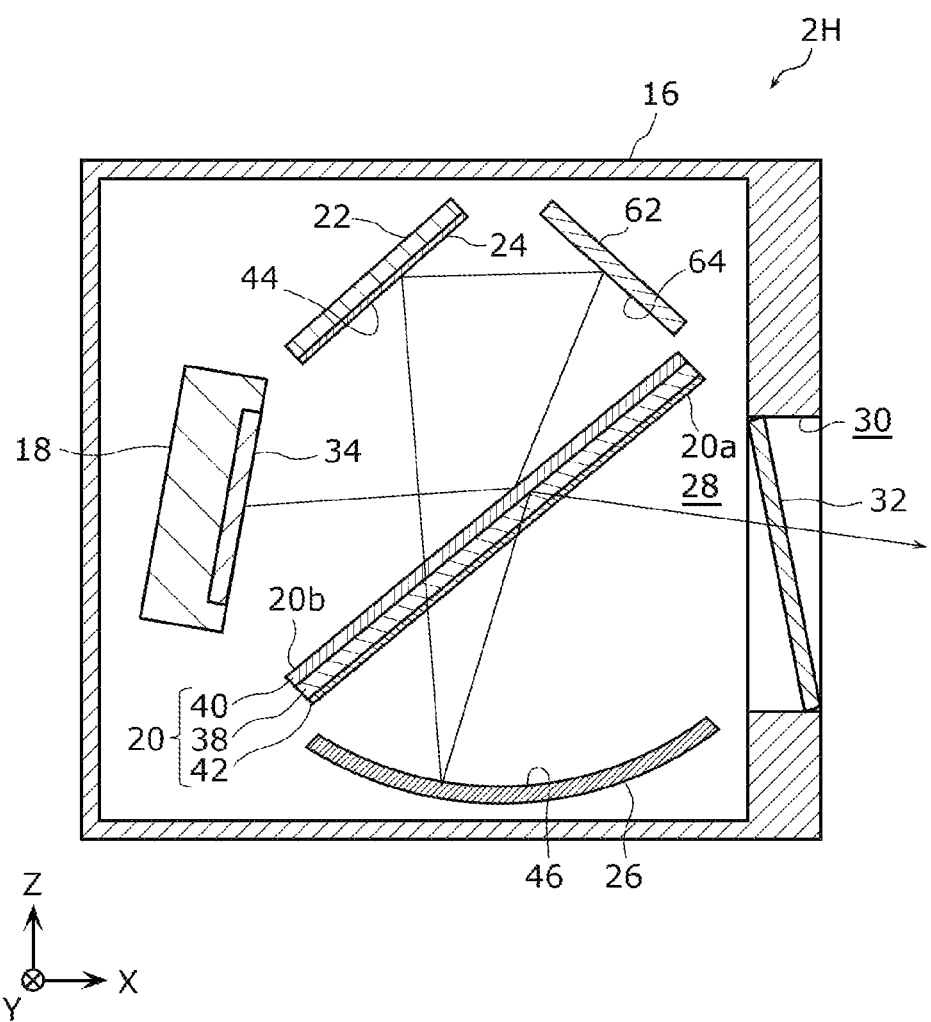
FIG. 21 is a sectional view of a display device according to Embodiment 7.

The configuration of display device 2H according to Embodiment 7 will be described with reference to FIG. 21. FIG. 21 is a sectional view of display device 2H according to Embodiment 7. In FIG. 21, the same components as in FIG. 3A are given the same symbols and will not be described in detail.

As shown in FIG. 21, as compared with the configuration in FIG. 3A, this embodiment is characterized in that third mirror 62 is added. Third mirror 62 is a plane mirror as with first mirror 22 and has planar reflection surface 64.

The emission light from display surface 34 of display element 18 is reflected off polarization element 20, then reflected off reflection surface 64 of third mirror 62 and off reflection surface 44 of first mirror 22, and transmitted through polarization element 20. The optical path thereafter is the same as in FIG. 3A.

Because of the reflection off third mirror 62, the above configuration can further increase the optical path length. Again, in the configuration in this embodiment, while being reflected off the mirrors (first mirror 22, second mirror 26, and third mirror 62) before exiting from case 16 through dust cover 32, the emission light from display surface 34 of display element 18 is reflected off polarization element 20 twice and transmitted through polarization element 20 once. Specifically, the emission light is reflected off polarization element 20, then reflected off third mirror 62 and first mirror 22, then transmitted through polarization element 20, then reflected off second mirror 26, and again reflected off polarization element 20.

OTHER VARIATIONS

Although the display device according to one or more aspects of the present disclosure has been described based on the above embodiments, the present disclosure is not limited to the embodiments. Those skilled in the art will readily appreciate that embodiments arrived at by making various modifications to the above embodiments or embodiments arrived at by selectively combining elements disclosed in the above embodiments without materially departing from the scope of the present disclosure may be included within one or more aspects of the present disclosure.

Although the emission light from display surface 34 of display element 18 in the above embodiments is linearly polarized light having the polarization direction in first direction d1, this is not limiting. Rather, the emission light may be linearly polarized light having the polarization direction in second direction d2.

Although first mirror 22 (22D) in the above embodiments is a plane mirror, this is not limiting. Rather, first mirror 22 (22D) may be a concave mirror. In this case, second mirror 26 (26F) may be either a concave mirror or a plane mirror. The mirrors may also be a combination of convex first mirror 22 and concave second mirror 26. Further, although third mirror 62 in Embodiment 7 above is a plane mirror, this is not limiting. Rather, third mirror may be a concave mirror.

Although second mirror 26 (26F) in the above embodiments is a concave mirror having a free-form surface, this is not limiting. For example, second mirror 26 (26F) may be a spherical concave mirror, an aspherical concave mirror, or a cylindrical mirror.

In the above embodiments, dust cover 30 or transmissive polarization plate 52 is disposed in opening 30. Instead, a liquid-crystal optical element that allows electrically switching between reflecting the light and transmitting the light may be provided in opening 30.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by reference in their entirety: Japanese Patent Applications Nos. 2020-065535 filed on Apr. 1, 2020 and 2020-191073 filed on Nov. 17, 2020.

INDUSTRIAL APPLICABILITY

The display device in the present disclosure is applicable to, for example, electronic mirrors provided in vehicles.

The invention claimed is:
1. A display device, comprising:
a display element including a display surface on which image is displayed;
a first mirror and a second mirror that each reflect emission light emitted from the display surface of the display element;
a first $\lambda/4$ plate; and
a polarization element, wherein:
the polarization element is configured to reflect and transmit the emission light,
the emission light is reflected off the polarization element, then reflected off one of the first and second mirrors, then transmitted though the polarization element, then reflected off another of the first and second mirrors, and then reflected again on the polarization element, the first mirror is closer to one of an upper end and a lower end of the display surface, the second mirror is closer to another of the upper end and the lower end of the display surface, the polarization element is located between the first mirror and the second mirror and opposes the display surface, the first λ/4 plate is located between the polarization element and the first mirror, the polarization element includes:
 a reflective polarization plate opposing the display surface and the first mirror; and
 a second λ/4 plate opposing the second mirror, and the emission light is:
 (a) reflected off the reflective polarization plate;
 (b) transmitted through the first λ/4 plate;
 (c) reflected off the first mirror to be transmitted again through the first λ/4 plate;
 (d) transmitted through each of the reflective polarization plate and the second λ/4 plate;
 (e) reflected off the second mirror;
 (f) transmitted through the second λ/4 plate; and
 (g) reflected off the reflective polarization plate to be transmitted again through the second λ/4 plate.

2. The display device according to claim 1, wherein
at least one of the first mirror and the second mirror is a concave mirror.

3. The display device according to claim 2, wherein
the second mirror is a concave mirror, and
at least one of an upper end part and a lower end part of the second mirror is curved to have a convex shape in a front view of the second mirror.

4. The display device according to claim 2, wherein
the second mirror is a concave mirror, and
the polarization element has an end part opposing the second mirror, the end part being curved to have a convex shape corresponding to a concave shape of the second mirror.

5. The display device according to claim 1, further comprising:
a transmissive polarization plate opposing the second λ/4 plate of the polarization element; and
a third λ/4 plate located between the transmissive polarization plate and the second λ/4 plate, wherein
the emission light which is reflected off the reflective polarization plate and then transmitted again through the second λ/4 plate is transmitted through each of the third λ/4 plate and the transmissive polarization plate.

6. The display device according to claim 1,
the polarization element has a wedge-shaped cross section, and
the polarization element includes a first end part closer to the second mirror and a second end part closer to the first mirror, the first end part having a thickness different from a thickness of the second end part.

7. The display device according to claim 1, wherein
the first mirror is a Fresnel mirror.

8. The display device according to claim 7, wherein
the first λ/4 plate is inclined with respect to the first mirror.

9. The display device according to claim 1, wherein
a perpendicular line perpendicular to the display surface is not parallel with an optical path of the emission light that is transmitted again through the second λ/4 plate after being reflected off the reflective polarization plate.

10. The display device according to claim 1, wherein
the emission light emitted from the display surface is a linear polarized light having a polarization direction perpendicular to a transmission axis of the reflective polarization plate, and the polarization element is inclined with respect to the display surface, about an axis line parallel to the polarization direction of the linear polarized light.

11. A display device comprising:
a display element including a display surface on which image is displayed;
a first mirror and a second mirror that each reflect emission light emitted from the display surface of the display element;
a polarization element configured to reflect and transmit the emission light;
a first λ/4 plate located between the polarization element and the first mirror; and
a case housing the display element, the first and second mirrors, and the polarization element, the case having an opening from which the emission light exits, wherein:

the emission light is reflected off the polarization element, then reflected off one of the first and second mirrors, then transmitted though the polarization element, then reflected off another of the first and second mirrors, and then reflected again on the polarization element, in a view from the opening,
 the display element is disposed in an upper part of the case,
 the first mirror is disposed in an innermost part of the case, and
 the second mirror is disposed in a lower part of the case, the polarization element is located between the display element and the second mirror and is inclined to cause an upper end part of the polarization element to be closer to the opening than a lower end part of the polarization element is, the polarization element is located between the first mirror and the second mirror and opposes the display surface, the polarization element includes:
 a reflective polarization plate opposing the display surface and the first mirror; and
 a second λ/4 plate opposing the second mirror, and the emission light is:
 (a) reflected off the reflective polarization plate;
 (b) transmitted through the first λ/4 plate;
 (c) reflected off the first mirror to be transmitted again through the first λ/4 plate;
 (d) transmitted through each of the reflective polarization plate and the second λ/4 plate;
 (e) reflected off the second mirror;
 (f) transmitted through the second λ/4 plate; and
 (g) reflected off the reflective polarization plate to be transmitted again through the second λ/4 plate.

12. The display device according to claim 11, wherein
at least one of the first mirror and the second mirror is a concave mirror.

13. The display device according to claim 12, wherein
the second mirror is a concave mirror, and
at least one of an upper end part and a lower end part of the second mirror is curved to have a convex shape in a front view of the second mirror.

14. The display device according to claim 12, wherein
the second mirror is a concave mirror, and
the polarization element has an end part opposing the second mirror, the end part being curved to have a convex shape corresponding to a concave shape of the second mirror.

15. The display device according to claim 11, further comprising:
a transmissive polarization plate opposing the second $\lambda/4$ plate of the polarization element; and
a third $\lambda/4$ plate located between the transmissive polarization plate and the second $\lambda/4$ plate, wherein
the emission light which is reflected off the reflective polarization plate and then transmitted again through the second $\lambda/4$ plate is transmitted through each of the third $\lambda/4$ plate and the transmissive polarization plate.

16. The display device according to claim 11,
the polarization element has a wedge-shaped cross section, and
the polarization element includes a first end part closer to the second mirror and a second end part closer to the first mirror, the first end part having a thickness different from a thickness of the second end part.

17. The display device according to claim 11, wherein the first mirror is a Fresnel mirror.

18. The display device according to claim 17, wherein the first $\lambda/4$ plate is inclined with respect to the first mirror.

19. The display device according to claim 11, wherein
a perpendicular line perpendicular to the display surface is not parallel with an optical path of the emission light that is transmitted again through the second $\lambda/4$ plate after being reflected off the reflective polarization plate.

20. The display device according to claim 11, wherein
the emission light emitted from the display surface is a linear polarized light having a polarization direction perpendicular to a transmission axis of the reflective polarization plate, and
the polarization element is inclined with respect to the display surface, about an axis line parallel to the polarization direction of the linear polarized light.

* * * * *